(12) United States Patent
Nguyen et al.

(10) Patent No.: US 10,304,043 B1
(45) Date of Patent: May 28, 2019

(54) MULTI-PERIPHERAL HOST DEVICE

(71) Applicant: Square, Inc., San Francisco, CA (US)

(72) Inventors: Anthony Nguyen, San Francisco, CA (US); Lukas Skoog, San Francisco, CA (US); Jason Binder, San Francisco, CA (US)

(73) Assignee: SQUARE, INC., San Francisco, CA (US)

( * ) Notice: Subject to any disclaimer, the term of this patent is extended or adjusted under 35 U.S.C. 154(b) by 993 days.

(21) Appl. No.: 14/284,218

(22) Filed: May 21, 2014

(51) Int. Cl.
*G06Q 20/20* (2012.01)
*G06Q 20/32* (2012.01)
*G01R 21/133* (2006.01)
*H01R 13/533* (2006.01)
*H05K 7/20* (2006.01)

(52) U.S. Cl.
CPC ......... *G06Q 20/204* (2013.01); *G01R 21/133* (2013.01); *G06Q 20/20* (2013.01); *G06Q 20/202* (2013.01); *G06Q 20/322* (2013.01); *G06Q 20/3278* (2013.01); *H01R 13/533* (2013.01); *H05K 7/20127* (2013.01)

(58) Field of Classification Search
CPC .... G06Q 20/204; G06Q 20/20; G06Q 20/322; G06Q 20/202; G06Q 20/3278; G01R 21/133; H01R 13/533; H05K 7/20127
USPC .......................................................... 705/17
See application file for complete search history.

(56) References Cited

U.S. PATENT DOCUMENTS

| | | |
|---|---|---|
| 3,854,036 A | 12/1974 | Gupta |
| 4,035,614 A | 7/1977 | Frattarola et al. |
| 4,254,441 A | 3/1981 | Fisher |
| 4,591,937 A | 5/1986 | Nakarai et al. |
| 4,609,957 A | 9/1986 | Gentet et al. |
| 4,727,544 A | 2/1988 | Brunner et al. |
| 4,788,420 A | 11/1988 | Chang et al. |
| 4,845,740 A | 7/1989 | Tokuyama et al. |
| 5,173,597 A | 12/1992 | Anglin |
| 5,266,789 A | 11/1993 | Anglin et al. |
| 5,406,627 A | 4/1995 | Thompson et al. |

(Continued)

FOREIGN PATENT DOCUMENTS

| CA | 2 812 251 A1 | 4/2012 |
|---|---|---|
| CA | 2 932 849 A1 | 6/2015 |

(Continued)

OTHER PUBLICATIONS

Majekodunmi, Muyinat O. Utilizing automatic identification tracking systems to compile operational field and structure data. University of Maryland, College Park, ProQuest Dissertations Publishing, 2014.*

(Continued)

*Primary Examiner* — Nathan C Uber

(74) *Attorney, Agent, or Firm* — Polsinelli

(57) ABSTRACT

Approaches provide for a point-of-sale system that includes, for example, a stand that supports a computing device. The computing device can run software configured to provide functionality for a point-of-sale system. The computing device can be connected to peripheral components, such as a cash drawer, a receipt printer, etc. through a hub or other device configured to host at least one of a plurality of peripheral ports and/or operate as a single client to the computing device.

20 Claims, 7 Drawing Sheets

(56) References Cited

U.S. PATENT DOCUMENTS

| | | |
|---|---|---|
| 5,434,395 A | 7/1995 | Storck et al. |
| 5,434,400 A | 7/1995 | Scherzer |
| 5,463,678 A | 10/1995 | Kepley, III et al. |
| 5,589,855 A | 12/1996 | Blumstein et al. |
| 5,603,078 A | 2/1997 | Henderson et al. |
| 5,616,904 A | 4/1997 | Fernadez |
| 5,679,943 A | 10/1997 | Schultz et al. |
| 5,729,591 A | 3/1998 | Bailey |
| 5,763,862 A | 6/1998 | Jachimowicz et al. |
| 5,764,742 A | 6/1998 | Howard et al. |
| 5,850,599 A | 12/1998 | Seiderman |
| 5,878,337 A | 3/1999 | Joao et al. |
| 5,907,801 A | 5/1999 | Albert et al. |
| 5,945,654 A | 8/1999 | Huang |
| 5,991,410 A | 11/1999 | Albert et al. |
| 5,991,749 A | 11/1999 | Morrill, Jr. |
| D417,442 S | 12/1999 | Butts et al. |
| 6,006,109 A | 12/1999 | Shin |
| 6,010,067 A | 1/2000 | Elbaum |
| 6,021,944 A | 2/2000 | Arakaki |
| 6,032,859 A | 3/2000 | Hughes et al. |
| 6,061,666 A | 5/2000 | Do et al. |
| 6,095,410 A | 8/2000 | Andersen et al. |
| 6,129,277 A | 10/2000 | Grant et al. |
| 6,234,389 B1 | 5/2001 | Valliani et al. |
| 6,308,227 B1 | 10/2001 | Kumar et al. |
| 6,363,139 B1 | 3/2002 | Zurek et al. |
| 6,400,517 B1 | 6/2002 | Murao |
| 6,431,445 B1 | 8/2002 | Deland et al. |
| 6,476,743 B1 | 11/2002 | Brown et al. |
| 6,481,623 B1 | 11/2002 | Grant et al. |
| 6,497,368 B1 | 12/2002 | Friend et al. |
| 6,536,670 B1 | 3/2003 | Postman et al. |
| D477,321 S | 7/2003 | Baughman |
| 6,612,488 B2 | 9/2003 | Suzuki |
| 6,813,608 B1 | 11/2004 | Baranowski |
| 6,832,721 B2 | 12/2004 | Fujll |
| 6,850,147 B2 | 2/2005 | Prokoski et al. |
| 6,868,391 B1 | 3/2005 | Hultgren |
| 6,896,182 B2 | 5/2005 | Sakaguchi |
| 6,944,782 B2 | 9/2005 | von Mueller et al. |
| 6,979,231 B2 | 12/2005 | Shinohara |
| 7,003,316 B1 | 2/2006 | Elias et al. |
| 7,013,149 B2 | 3/2006 | Vetro et al. |
| 7,149,296 B2 | 12/2006 | Brown et al. |
| 7,167,711 B1 | 1/2007 | Dennis |
| 7,252,232 B2 | 8/2007 | Fernandes et al. |
| 7,309,012 B2 | 12/2007 | Von Mueller et al. |
| 7,324,836 B2 | 1/2008 | Steenstra et al. |
| 7,363,054 B2 | 4/2008 | Elias et al. |
| D575,056 S | 8/2008 | Tan |
| 7,409,234 B2 | 8/2008 | Glezerman |
| 7,424,732 B2 | 9/2008 | Matsumoto et al. |
| 7,433,452 B2 | 10/2008 | Taylor et al. |
| 7,505,762 B2 | 3/2009 | Onyon et al. |
| 7,506,812 B2 | 3/2009 | von Mueller et al. |
| D590,828 S | 4/2009 | Sherrod et al. |
| 7,520,430 B1 | 4/2009 | Stewart et al. |
| 7,581,678 B2 | 9/2009 | Narendra et al. |
| 7,600,673 B2 | 10/2009 | Stoutenburg et al. |
| D607,000 S | 12/2009 | Cheng et al. |
| 7,668,308 B1 | 2/2010 | Wurtz |
| 7,703,676 B2 | 4/2010 | Hart et al. |
| 7,708,189 B1 | 5/2010 | Cipriano |
| 7,757,953 B2 | 7/2010 | Hart et al. |
| 7,793,834 B2 | 9/2010 | Hachey et al. |
| 7,810,729 B2 | 10/2010 | Morley, Jr. |
| 7,869,591 B1 | 1/2011 | Nagel et al. |
| 7,945,494 B2 | 5/2011 | Williams |
| 8,011,587 B2 | 9/2011 | Johnson et al. |
| 8,015,070 B2 | 9/2011 | Sinha et al. |
| D646,264 S | 10/2011 | Dong |
| D653,664 S | 2/2012 | Turnbull et al. |
| 8,132,670 B1 | 3/2012 | Chen |
| 8,231,055 B2 | 7/2012 | Wen |
| 8,297,507 B2 | 10/2012 | Kayani |
| 8,302,860 B2 | 11/2012 | McKelvey |
| 8,336,771 B2 | 12/2012 | Tsai et al. |
| D675,618 S | 2/2013 | Behar et al. |
| 8,376,239 B1 | 2/2013 | Humphrey |
| D677,667 S | 3/2013 | Smith et al. |
| D679,714 S | 4/2013 | Smith et al. |
| D680,537 S | 4/2013 | Miller et al. |
| 8,413,901 B2 | 4/2013 | Wen |
| 8,452,004 B2 | 5/2013 | Lee |
| D686,208 S | 7/2013 | Miller et al. |
| 8,500,010 B1 | 8/2013 | Marcus et al. |
| 8,500,018 B2 | 8/2013 | McKelvey et al. |
| 8,560,823 B1 | 10/2013 | Aytek et al. |
| 8,571,989 B2 | 10/2013 | Dorsey et al. |
| 8,573,486 B2 | 11/2013 | McKelvey et al. |
| 8,573,487 B2 | 11/2013 | McKelvey |
| 8,573,489 B2 | 11/2013 | Dorsey et al. |
| 8,584,946 B2 | 11/2013 | Morley, Jr. |
| 8,584,956 B2 | 11/2013 | Wilson et al. |
| 8,602,305 B2 | 12/2013 | Dorsey et al. |
| 8,612,352 B2 | 12/2013 | Dorsey et al. |
| 8,615,445 B2 | 12/2013 | Dorsey et al. |
| 8,640,953 B2 | 2/2014 | Dorsey et al. |
| D700,606 S | 3/2014 | Lo |
| 8,662,389 B2 | 3/2014 | Dorsey et al. |
| 8,678,277 B2 | 3/2014 | Dorsey et al. |
| D703,211 S | 4/2014 | Weller et al. |
| 8,701,996 B2 | 4/2014 | Dorsey et al. |
| 8,701,997 B2 | 4/2014 | Dorsey et al. |
| D706,266 S | 6/2014 | Rotsaert |
| 8,740,072 B1 | 6/2014 | Dorogusker |
| 8,763,900 B2 | 7/2014 | Marcus et al. |
| D711,876 S | 8/2014 | McWilliam et al. |
| 8,794,517 B1 | 8/2014 | Templeton et al. |
| D712,892 S | 9/2014 | Hong et al. |
| 8,820,650 B2 | 9/2014 | Wilson et al. |
| 8,840,017 B2 | 9/2014 | Chan et al. |
| 8,840,024 B2 | 9/2014 | McKelvey et al. |
| 8,870,070 B2 | 10/2014 | McKelvey et al. |
| 8,870,071 B2 | 10/2014 | McKelvey |
| 8,876,003 B2 | 11/2014 | McKelvey |
| 8,910,868 B1 | 12/2014 | Wade et al. |
| 8,931,699 B1 | 1/2015 | Wade et al. |
| D724,094 S | 3/2015 | Blochinger et al. |
| D725,655 S | 3/2015 | Debaigue et al. |
| 8,967,465 B1 | 3/2015 | Wade et al. |
| D726,171 S | 4/2015 | Edwards |
| 9,016,570 B1 | 4/2015 | Gluck |
| 9,016,572 B2 | 4/2015 | Babu et al. |
| D728,549 S | 5/2015 | Su et al. |
| D728,568 S | 5/2015 | Debaigue et al. |
| D731,493 S | 6/2015 | Mills |
| 9,063,737 B2 | 6/2015 | Babu et al. |
| D740,820 S | 10/2015 | Templeton et al. |
| 9,218,517 B2 | 12/2015 | Morley, Jr. |
| 9,237,401 B2 | 1/2016 | Modi et al. |
| 9,256,769 B1 | 2/2016 | Lamfalusi et al. |
| 9,256,770 B1 | 2/2016 | Edwards |
| 9,355,285 B1 | 5/2016 | Wade et al. |
| D762,651 S | 8/2016 | Edwards et al. |
| 9,576,159 B1 | 2/2017 | Templeton et al. |
| 9,633,236 B1 | 4/2017 | Wade |
| 9,760,740 B1 | 9/2017 | Edwards |
| 2001/0001856 A1 | 5/2001 | Gould et al. |
| 2002/0002507 A1 | 1/2002 | Hatakeyama |
| 2002/0017568 A1 | 2/2002 | Grant et al. |
| 2002/0030871 A1 | 3/2002 | Anderson et al. |
| 2002/0073304 A1 | 6/2002 | Marsh et al. |
| 2002/0077974 A1 | 6/2002 | Ortiz |
| 2002/0099648 A1 | 7/2002 | DeVoe et al. |
| 2002/0108062 A1 | 8/2002 | Nakajima et al. |
| 2002/0165462 A1 | 11/2002 | Westbrook et al. |
| 2002/0169541 A1 | 11/2002 | Bouve et al. |
| 2002/0188535 A1 | 12/2002 | Chao et al. |
| 2003/0089772 A1 | 5/2003 | Yuan |
| 2003/0132300 A1 | 7/2003 | Dilday et al. |
| 2003/0135463 A1 | 7/2003 | Brown et al. |
| 2003/0144040 A1 | 7/2003 | Liu et al. |

(56) References Cited

U.S. PATENT DOCUMENTS

| | | |
|---|---|---|
| 2004/0011650 A1 | 1/2004 | Zenhausern et al. |
| 2004/0012875 A1 | 1/2004 | Wood |
| 2004/0033726 A1 | 2/2004 | Kao |
| 2004/0041911 A1 | 3/2004 | Odagiri et al. |
| 2004/0058705 A1 | 3/2004 | Morgan et al. |
| 2004/0087339 A1 | 5/2004 | Goldthwaite et al. |
| 2004/0093496 A1 | 5/2004 | Colnot |
| 2004/0104268 A1 | 6/2004 | Bailey |
| 2004/0127256 A1 | 7/2004 | Goldthwaite et al. |
| 2004/0128256 A1 | 7/2004 | Dhanjal et al. |
| 2004/0151026 A1 | 8/2004 | Naso et al. |
| 2004/0178326 A1 | 9/2004 | Hamilton et al. |
| 2004/0204074 A1 | 10/2004 | Desai |
| 2004/0204082 A1 | 10/2004 | Abeyta |
| 2004/0230489 A1 | 11/2004 | Goldthwaite et al. |
| 2004/0230526 A1 | 11/2004 | Praisner |
| 2004/0235524 A1 | 11/2004 | Abuhamdeh |
| 2005/0009004 A1 | 1/2005 | Xu et al. |
| 2005/0010702 A1 | 1/2005 | Saito et al. |
| 2005/0023348 A1 | 2/2005 | Lucas et al. |
| 2005/0077870 A1 | 4/2005 | Ha et al. |
| 2005/0156037 A1 | 7/2005 | Wurzburg |
| 2005/0156038 A1 | 7/2005 | Wurzburg et al. |
| 2005/0164631 A1 | 7/2005 | Jin |
| 2005/0167496 A1 | 8/2005 | Morley, Jr. et al. |
| 2005/0194452 A1 | 9/2005 | Nordentoft et al. |
| 2005/0209719 A1 | 9/2005 | Beckert et al. |
| 2005/0219728 A1 | 10/2005 | Durbin et al. |
| 2005/0236480 A1 | 10/2005 | Vrotsos et al. |
| 2005/0242173 A1 | 11/2005 | Suzuki |
| 2005/0247787 A1 | 11/2005 | Von Mueller et al. |
| 2005/0283403 A1* | 12/2005 | Ramirez ............... G06Q 20/20 705/16 |
| 2006/0000917 A1 | 1/2006 | Kim et al. |
| 2006/0049255 A1 | 3/2006 | Von Mueller et al. |
| 2006/0094481 A1 | 5/2006 | Gullickson |
| 2006/0122902 A1 | 6/2006 | Petrov et al. |
| 2006/0123138 A1 | 6/2006 | Perdomo et al. |
| 2006/0152276 A1 | 7/2006 | Barksdale |
| 2006/0208066 A1 | 9/2006 | Finn et al. |
| 2006/0219776 A1 | 10/2006 | Finn |
| 2006/0223580 A1 | 10/2006 | Antonio et al. |
| 2006/0234771 A1 | 10/2006 | Shavrov |
| 2006/0273158 A1 | 12/2006 | Suzuki |
| 2007/0063048 A1 | 3/2007 | Havens et al. |
| 2007/0067833 A1 | 3/2007 | Colnot |
| 2007/0100651 A1 | 5/2007 | Ramer et al. |
| 2007/0124211 A1 | 5/2007 | Smith |
| 2007/0155430 A1 | 7/2007 | Cheon et al. |
| 2007/0174080 A1 | 7/2007 | Outwater |
| 2007/0201492 A1 | 8/2007 | Kobayashi |
| 2007/0221728 A1 | 9/2007 | Ferro et al. |
| 2007/0236336 A1 | 10/2007 | Borcherding |
| 2007/0244811 A1 | 10/2007 | Tumminaro |
| 2007/0250623 A1 | 10/2007 | Hickey et al. |
| 2007/0255620 A1 | 11/2007 | Tumminaro et al. |
| 2007/0255643 A1 | 11/2007 | Capuano et al. |
| 2007/0255653 A1 | 11/2007 | Tumminaro et al. |
| 2007/0287498 A1 | 12/2007 | Wang et al. |
| 2008/0011850 A1 | 1/2008 | Henry |
| 2008/0017712 A1 | 1/2008 | Hart et al. |
| 2008/0027815 A1 | 1/2008 | Johnson et al. |
| 2008/0040265 A1 | 2/2008 | Rackley, III et al. |
| 2008/0040274 A1 | 2/2008 | Uzo |
| 2008/0059370 A1 | 3/2008 | Sada et al. |
| 2008/0059375 A1 | 3/2008 | Abifaker |
| 2008/0103972 A1 | 5/2008 | Lane |
| 2008/0147564 A1 | 6/2008 | Singhal |
| 2008/0172306 A1 | 7/2008 | Schorr et al. |
| 2008/0177662 A1 | 7/2008 | Alton et al. |
| 2008/0208762 A1 | 8/2008 | Arthur et al. |
| 2008/0238610 A1 | 10/2008 | Rosenberg |
| 2008/0249939 A1 | 10/2008 | Veenstra |
| 2008/0275779 A1 | 11/2008 | Lakshminarayanan |
| 2008/0294766 A1 | 11/2008 | Wang et al. |
| 2009/0048978 A1 | 2/2009 | Ginter et al. |
| 2009/0068982 A1 | 3/2009 | Chen et al. |
| 2009/0098908 A1 | 4/2009 | Silverbrook et al. |
| 2009/0100168 A1 | 4/2009 | Harris |
| 2009/0104920 A1 | 4/2009 | Moon et al. |
| 2009/0117883 A1 | 5/2009 | Coffing et al. |
| 2009/0119190 A1 | 5/2009 | Realini |
| 2009/0125429 A1 | 5/2009 | Takayama |
| 2009/0144161 A1 | 6/2009 | Fisher |
| 2009/0159681 A1 | 6/2009 | Mullen et al. |
| 2009/0166422 A1 | 7/2009 | Biskupski |
| 2009/0172384 A1* | 7/2009 | Anson ................. G06F 9/44505 713/2 |
| 2009/0180354 A1 | 7/2009 | Sander et al. |
| 2009/0187492 A1 | 7/2009 | Hammad et al. |
| 2009/0302806 A1 | 12/2009 | Lindlar et al. |
| 2010/0063893 A1 | 3/2010 | Townsend |
| 2010/0108762 A1 | 5/2010 | Morley, Jr. |
| 2010/0127857 A1 | 5/2010 | Kilmurray et al. |
| 2010/0128900 A1 | 5/2010 | Johnson |
| 2010/0184479 A1 | 7/2010 | Griffin, Jr. |
| 2010/0222000 A1 | 9/2010 | Sauer et al. |
| 2010/0241838 A1 | 9/2010 | Cohen et al. |
| 2010/0243732 A1 | 9/2010 | Wallner |
| 2010/0260341 A1 | 10/2010 | Sander et al. |
| 2010/0289390 A1 | 11/2010 | Kenney |
| 2010/0314446 A1 | 12/2010 | Morley, Jr. |
| 2011/0033910 A1 | 2/2011 | Maho et al. |
| 2011/0053560 A1 | 3/2011 | Jain et al. |
| 2011/0062235 A1 | 3/2011 | Morley, Jr. |
| 2011/0084131 A1 | 4/2011 | McKelvey |
| 2011/0084139 A1 | 4/2011 | McKelvey et al. |
| 2011/0084140 A1 | 4/2011 | Wen |
| 2011/0137803 A1 | 6/2011 | Willins |
| 2011/0161235 A1 | 6/2011 | Beenau et al. |
| 2011/0165896 A1 | 7/2011 | Stromberg et al. |
| 2011/0174879 A1 | 7/2011 | Morley, Jr. |
| 2011/0180601 A1 | 7/2011 | Morley, Jr. |
| 2011/0191196 A1 | 8/2011 | Orr et al. |
| 2011/0198395 A1 | 8/2011 | Chen |
| 2011/0202463 A1 | 8/2011 | Powell |
| 2011/0231272 A1 | 9/2011 | Englund et al. |
| 2011/0258120 A1 | 10/2011 | Weiss |
| 2011/0313880 A1 | 12/2011 | Paul et al. |
| 2012/0008851 A1 | 1/2012 | Pennock et al. |
| 2012/0011024 A1 | 1/2012 | Dorsey et al. |
| 2012/0011071 A1 | 1/2012 | Pennock et al. |
| 2012/0012653 A1 | 1/2012 | Johnson et al. |
| 2012/0016794 A1 | 1/2012 | Orr et al. |
| 2012/0026018 A1 | 2/2012 | Lin |
| 2012/0052910 A1 | 3/2012 | Mu et al. |
| 2012/0066079 A1* | 3/2012 | Falzone ................. G06Q 20/20 705/16 |
| 2012/0095869 A1 | 4/2012 | McKelvey |
| 2012/0095870 A1 | 4/2012 | McKelvey |
| 2012/0097739 A1 | 4/2012 | Babu et al. |
| 2012/0097740 A1 | 4/2012 | Lamba et al. |
| 2012/0118956 A1 | 5/2012 | Lamba |
| 2012/0118959 A1 | 5/2012 | Sather et al. |
| 2012/0118960 A1 | 5/2012 | Sather et al. |
| 2012/0126005 A1 | 5/2012 | Dorsey et al. |
| 2012/0126006 A1 | 5/2012 | Dorsey et al. |
| 2012/0126007 A1 | 5/2012 | Lamba |
| 2012/0126010 A1 | 5/2012 | Babu et al. |
| 2012/0126011 A1 | 5/2012 | Lamba et al. |
| 2012/0126012 A1 | 5/2012 | Lamba et al. |
| 2012/0126013 A1 | 5/2012 | Sather et al. |
| 2012/0126014 A1 | 5/2012 | Sather et al. |
| 2012/0130903 A1 | 5/2012 | Dorsey et al. |
| 2012/0132712 A1 | 5/2012 | Babu et al. |
| 2012/0138683 A1 | 6/2012 | Sather et al. |
| 2012/0154561 A1 | 6/2012 | Chari |
| 2012/0168505 A1 | 7/2012 | Sather et al. |
| 2012/0234918 A1 | 9/2012 | Lindsay |
| 2012/0246074 A1 | 9/2012 | Annamalai et al. |
| 2012/0255996 A1 | 10/2012 | Ahmed et al. |
| 2012/0259651 A1 | 10/2012 | Mallon et al. |
| 2012/0270528 A1 | 10/2012 | Goodman |
| 2013/0021046 A1 | 1/2013 | Prentice et al. |

(56) References Cited

U.S. PATENT DOCUMENTS

| | | | |
|---|---|---|---|
| 2013/0031003 A1 | 1/2013 | Dorsey et al. | |
| 2013/0031004 A1 | 1/2013 | Dorsey et al. | |
| 2013/0087614 A1 | 4/2013 | Limtao et al. | |
| 2013/0137367 A1 | 5/2013 | Fisher | |
| 2013/0200147 A1 | 8/2013 | Dorsey et al. | |
| 2013/0200148 A1 | 8/2013 | Dorsey et al. | |
| 2013/0200149 A1 | 8/2013 | Dorsey et al. | |
| 2013/0200153 A1 | 8/2013 | Dorsey et al. | |
| 2013/0200154 A1 | 8/2013 | Dorsey et al. | |
| 2013/0204788 A1 | 8/2013 | Dorsey et al. | |
| 2013/0204791 A1 | 8/2013 | Dorsey et al. | |
| 2013/0204792 A1 | 8/2013 | Dorsey et al. | |
| 2013/0207481 A1 | 8/2013 | Gobburu et al. | |
| 2013/0254117 A1 | 9/2013 | von Mueller et al. | |
| 2013/0254118 A1 | 9/2013 | Dorsey et al. | |
| 2013/0254574 A1 | 9/2013 | Zacchio et al. | |
| 2013/0278122 A1* | 10/2013 | Edwards | E05B 65/461 312/237 |
| 2013/0290762 A1 | 10/2013 | Pawar | |
| 2013/0299575 A1 | 11/2013 | McKelvey et al. | |
| 2013/0304244 A1 | 11/2013 | Ojanpera | |
| 2013/0320089 A1 | 12/2013 | Marcus et al. | |
| 2014/0001257 A1 | 1/2014 | Dorsey et al. | |
| 2014/0001263 A1 | 1/2014 | Babu et al. | |
| 2014/0017955 A1 | 1/2014 | Lo et al. | |
| 2014/0018016 A1* | 1/2014 | Chang | H04M 1/7253 455/90.1 |
| 2014/0061301 A1 | 3/2014 | Cho et al. | |
| 2014/0076964 A1 | 3/2014 | Morley, Jr. | |
| 2014/0089205 A1 | 3/2014 | Kapur et al. | |
| 2014/0097242 A1 | 4/2014 | McKelvey | |
| 2014/0124576 A1 | 5/2014 | Zhou | |
| 2014/0131442 A1 | 5/2014 | Morrow et al. | |
| 2014/0144983 A1 | 5/2014 | Dorsey et al. | |
| 2014/0203082 A1 | 7/2014 | Huh | |
| 2014/0258132 A1 | 9/2014 | Swamy et al. | |
| 2014/0265642 A1 | 9/2014 | Utley et al. | |
| 2014/0295761 A1 | 10/2014 | Lo | |
| 2014/0297539 A1 | 10/2014 | Swamy et al. | |
| 2015/0078560 A1 | 3/2015 | Ilango et al. | |
| 2015/0100495 A1 | 4/2015 | Salama et al. | |
| 2015/0149992 A1 | 5/2015 | Wade et al. | |
| 2015/0161419 A1 | 6/2015 | Wade et al. | |
| 2015/0199677 A1 | 7/2015 | Wade et al. | |
| 2015/0200590 A1 | 7/2015 | Tanzawa | |
| 2016/0055478 A1 | 2/2016 | Skoog | |
| 2016/0070940 A1 | 3/2016 | Lamba et al. | |
| 2016/0132703 A1 | 5/2016 | Lamfalusi et al. | |
| 2016/0188915 A1 | 6/2016 | Babu et al. | |
| 2016/0203466 A1 | 7/2016 | Lamba et al. | |
| 2016/0203667 A1 | 7/2016 | Lamba et al. | |
| 2016/0239691 A1 | 8/2016 | Wade et al. | |
| 2016/0371513 A1 | 12/2016 | Lamba et al. | |

FOREIGN PATENT DOCUMENTS

| | | |
|---|---|---|
| CA | 2 920 589 A1 | 8/2016 |
| CN | 2459833 Y | 11/2001 |
| CN | 2543289 Y | 4/2003 |
| CN | 1682240 A | 10/2005 |
| CN | 1860730 A | 11/2006 |
| CN | 101520928 A | 9/2009 |
| CN | 302341093 S | 3/2013 |
| CN | 302526592 S | 8/2013 |
| EP | 1 145 766 A2 | 10/2001 |
| EP | 2 693 298 A2 | 2/2014 |
| EP | 3 091 474 A1 | 11/2016 |
| HK | 1211124 A1 | 5/2016 |
| JP | 2003-108777 A | 4/2003 |
| JP | 2004-078662 A | 3/2004 |
| JP | 2005-063869 A | 3/2005 |
| JP | 2005-242550 A | 9/2005 |
| JP | 2005-269172 A | 9/2005 |
| JP | 2009-199649 A | 9/2009 |
| JP | 2001-313714 A | 11/2011 |
| JP | 2013-518344 A | 5/2013 |
| KR | 10-0452161 B1 | 10/2004 |
| KR | 10-2005-0077659 A | 8/2005 |
| KR | 10-2008-0039330 A | 5/2008 |
| WO | 01/37199 A1 | 5/2001 |
| WO | 01/65827 A2 | 9/2001 |
| WO | 02/084548 A1 | 10/2002 |
| WO | 2007/070592 A2 | 6/2007 |
| WO | 2009/128483 A1 | 10/2009 |
| WO | 2010/097711 A2 | 9/2010 |
| WO | 2010/111130 | 9/2010 |
| WO | 2010/135174 A1 | 11/2010 |
| WO | 2011/047028 A2 | 4/2011 |
| WO | 2011/047030 A2 | 4/2011 |
| WO | 2012/051070 A2 | 4/2012 |
| WO | 2013/009891 A1 | 1/2013 |
| WO | 2013/074499 A1 | 5/2013 |
| WO | 2015/081002 A1 | 6/2015 |
| WO | 2015/089301 A1 | 6/2015 |
| WO | 2016/028823 A1 | 2/2016 |

OTHER PUBLICATIONS

Non-Final Office Action dated Nov. 21, 2013, for U.S. Appl. No. 14/052,009, of Wilson, M., et al., filed Oct. 11, 2013.

Non-Final Office Action dated Jul. 19, 2012, for U.S. Appl. No. 12/903,758, of Wilson, M., et al., filed Oct. 13, 2010.

"Reading magnetic cards (almost) for free," Lekernel's Scrapbook, ("Lekernel"), Jan. 26, 2009, Retrieved from the Internet URL: http://lekernel.net/blog/?p=12, on May 5, 2011, pp. 1-2.

"MSR500EX (Mini123EX) Portable Magnetic Stripe Card Reader," TYNER, Apr. 27, 2007, Retrieved from the Internet URL: http://www.tyner.com/magnetic/msr500ex.htm, on Apr. 22, 2011, pp. 1-3.

Padilla, L., "Turning your mobile into a magnetic stripe reader," Retrieved from the Internet URL: http://www.gae.ucm.es/~padilla/extrawork/mobilesoundtrack.html, on Feb. 7, 2011, pp. 1-4.

Padilla, L., "Magnetic stripe reader circuit," Jan. 28, 1997, Retrieved from the Internet URL: http://www.gae.ucm.es/~padilla/extraworklmagamp.html, on May 5, 2011, pp. 1-7.

Padilla, L. "The simplest magnetic stripe reader," Jan. 27, 2003, Retrieved from the Internet URL: www.gae.ucm.esi~padilla/extrawork/soundtrack.html, on Dec. 21, 2009, pp. 1-5.

"Travel industry targeted for Palm PDA card reader," Retrieved from the Internet URL: http://www.m-travel.com/news/2001/08/travel_industry.html, on Apr. 19, 2011, pp. 1-2.

"Semtek to target healthcare with HandEra PDAs and PDA swipe card reader," Aug. 29, 2001, Retrieved from the Internet URL: http://www.pdacortex.com/semtek.htm, on Apr. 19, 2011, pp. 1-2.

"Semtek 3913 Insert Magnetic Card Reader 20 Pin Serial RS232," Product description, RecycledGoods.com, Retrieved from the Internet URL: http://www.recycledgoods.com/products/Semtek-3913-Insert-Magnetic-Card-Reader-20-Pi . . . , on Apr. 19, 2011, pp. 1-3.

"Credit Card Swiper and Reader for iPhone, iPad, Blackberry, Android and more," Retrieved from the Internet URL: http://hubpages.com/hub/Credit-Card-Swiper-and-Reader-for-iPhone-iPad-Blackberry-An . . . , on Apr. 20, 2011, pp. 1-2.

Titlow, J.P., "ROAM pay is like Square for Blackberry (Plus Android, iOS and Desktops)," Dec. 1, 2010, Retrieved from the Internet URL: http://www.readwriteweb.com/biz/2010/12/roampay-is-like-square-for-bla.php, on Apr. 20, 2011, pp. 1-12.

Veneziani, V., "Use a cellphone as a magnetic card reader," Apr. 15, 2005, Retrieved from the Internet URL: http://hackaday.com/2005/04/15/use a-cellphone-as-a-magnetic-card . . . , on Feb. 7, 2011, pp. 1-10.

Buttell, A.E., "Merchants eye mobile phones to transact card payments," Feb. 3, 2010, Retrieved from the Internet URL: http://www.merchantaccountguide.com/merchant-account-news/cell-phone-credit-card-mer . . . , on Feb. 8, 2011, pp. 1-3.

"USB Magnetic Stripe Credit/Card Track-2 Reader and Writer (75/210BPI)," Deal Extreme (dealextreme.com), Nov. 15, 2008, Retrieved from the Internet URL: http://www.dealextreme.com/p/usb-magnetic-stripe-credit-debit-card-track-2-reader-and-wr . . . , on Feb. 8, 2011, pp. 1-3.

(56) References Cited

OTHER PUBLICATIONS

"Mophie Marketplace Magnetic Strip Reader/Case for iPhone 3G & 3GS—Grey," J&R (JR.com), Retrieved from the Internet URL: http://www.jr.com/mophie/pe/MPE_MPIP3GBLK, on Feb. 8, 2011, pp. 1-1.
"Barcode scanner and Magnetic Stripe Reader (MSR) for Pocke . . . ," Tom's Hardware (tomshardware.com), Retrieved from the Internet URL: http://www.tomshardware.com/forum/24068-36-barcode-scanner-magnetic-stripe-reader-po . . . , on Feb. 8, 2011, pp. 1-2.
"A Magnetic Stripe Reader—Read Credit Cards & Driver Licences!," Articlesbase (articlesbase.com), Sep. 7, 2009, Retrieved from the Internet URL: http://www.articlesbase.com/electronics-articles/a-magnetic-stripe-reader-read-credit-cards- . . . , on Feb. 8, 2011, pp. 1-3.
Jones, R., "U.S. Credit Cards to get a high-tech makeover," Oct. 22, 2010, Retrieved from the Internet URL: http://lifeine.today.com/_news/2010/10/22/5334208-us-credit-cards-to-get-a-high-tech-mak . . . , on Feb. 8, 2011, pp. 1-8.
"Arduino magnetic stripe decoder," Instructables, Retrieved from the Internet URL: http://www.instructables.com/id/Arduino-magneticstripe-decorded, on Feb. 8, 2011, pp. 1-5.
"Magnetic Stripe Reader (MSR) MSR7000-100R," Motorola Solutions, Retrieved from the Internet URL: http://www.motorola.com/business/US-EN/MSR7000-100R_US-EN.do?vgnextoid=164fc3 . . . , on Feb. 8, 2011, pp. 1-1.
"Pay@PC," Retrieved from the Internet URL: http://www.merchantanywhere.com/PAY_AT_PCT@PC.htm, on Feb. 11, 2011, pp. 1-2.
"Get paid on the spot from your mobile phone," Retrieved from the Internet URL: http://payments.intuit.com/products/basic-payment-solutions/mobile-credit-card-processin . . . , on Feb. 11, 2011, pp. 1-3.
"TOUCH-PAY Wireless Credit Card Processing," MerchantSeek, Retrieved from the Internet URL: http://www.merchantseek.com/wireless-credit-card-processing.htm, on Feb. 11, 2011, pp. 1-5.
"Announcement: Semtek Introduces Side Swipe II Card Reader for Wireless Devices," Brighthand, Retrieved from the Internet URL: http://forum.brighthand.com/pdas-handhelds/173285-announcement-semtek-introduces-sid . . . , on Apr. 19, 2011, pp. 1-2.
Grandison, K., "vTerminal Credit Card Processing App for AuthorizeNet and PayPal Payflow Pro for Curve 8350 8500 8900 and Bold 9000," Retrieved from the Internet URL: http://www.4blackberry.net/tag/business-tools/vterminal-credit-card-processing-app-for-authorizenet-and-paypal-payflow-pro-for-curve-8350-8500-890-download-2075.html, on Mar. 30, 2015, pp. 1-4.
Harris, A., "Magnetic Stripe Card Spoofer," Aug. 4, 2008, Retrieved from the Internet URL: http://hackaday.com/2008/08/04/magnetic-stripe-card-spoofer/, on Apr. 25, 2011, pp. 1-11.
"Headphone Jack (3.5mm)," Retrieved from the Internet URL: http://www.phonescoop.com/glossary/term.php?gid=440, on May 5, 2011, pp. 1-1.
"2.5mm Headset Jack," Retrieved from the Internet URL: http://www.phonescoop.com/glossary/term.php?gid=360, on May 5, 2011, pp. 1-1.
"Reference Designations for Electrical and Electronics Parts and Equipment," Engineering Drawing and Related Documentation Practices, ASME Y14.44/2008, The American Society of Mechanical Engineers, Nov. 21, 2008, pp. 1-31.
Acidus, "Mag-stripe Interfacing—A Lost Art," Retrieved from the Internet URL: http://www.scribd.com/doc/18236182/Magstripe-Interfacing#open_ . . . , on Feb. 7, 2011, pp. 1-4.
"Mag-stripe readers the hunt for a homebrew mag-stripe reader that'll work with modern," Jan. 16, 2009, Retrieved from the Internet URL: http://www.hak5.org/forums/index.php?showtopic=11563&st=20, on Apr. 25, 2011, pp. 1-6.
Kuo, Y-S et al., "Hijacking Power and Bandwidth from the Mobile Phone's Audio Interface," Proceedings of the First ACM Symposium on Computing for Development, (DEV'10), Dec. 17, 2010, pp. 1-10.
Website: www.alexwinston.com, Aug. 31, 2009, pp. 1-5.
"Magnetic Card Reader," lekernel.net~scrapbook, Retrieved from the Internet URL: http://lekernel.net/scrapbook/old/cardreader.html, on Apr. 25, 2011, pp. 1-4.
"Magnetic stripe reader/writer," Retrieved from the Internet URL: http://www.gae.ucm.es/-padilla/extrawork/stripe.html, on Dec. 21, 2009, pp. 1-2.
Lucks, S., "Two-Pass Authenticated Encryption Faster than Generic Composition," H. Gilbert and H. Handschuh (Eds.): FSE 2005, LNCS 3557, © International Association for Cryptologic Research 2005, pp. 284-298.
Bauer, G.R. et al., "Comparing Block Cipher Modes of Operation on MICAz Sensor Nodes," 17th Euromicro International Conference on Parallel, Distributed and Network-based Processing, 2009, Feb. 18-20, 2009, pp. 371-378.
European Search Report and Opinion for European Patent Application No. 11 786 731.7, dated Mar. 28, 2014.
Office Action for European Patent Application No. 11 786 731.7, dated Jul. 16, 2015.
Non-Final Office Action dated Sep. 30, 2011, for U.S. Appl. No. 12/903,753, of McKelvey, J., et al., filed Oct. 13, 2010.
Final Office Action dated Jul. 6, 2012, for U.S. Appl. No. 12/903,753, of McKelvey, J., et al., filed Oct. 13, 2010.
Non-Final Office Action dated Jul. 8, 2013, for U.S. Appl. No. 12/903,753, of McKelvey, J., et al., filed Oct. 13, 2010.
Notice of Allowance dated Oct. 10, 2013, for U.S. Appl. No. 12/903,753, of Mckelvey, J., filed Oct. 13, 2010.
Final Office Action dated Apr. 24, 2013, for U.S. Appl. No. 12/903,758, of Wilson, M., et al., filed Oct. 13, 2010.
Notice of Allowance dated Aug. 6, 2013, for U.S. Appl. No. 12/903,758, of Wilson, M., et al., filed Oct. 13, 2010.
Notice of Allowance dated Apr. 4, 2014, for U.S. Appl. No. 14/052,009, of Wilson, M., et al., filed Oct. 11, 2013.
Notice of Allowance dated Jul. 30, 2014, for U.S. Appl. No. 14/052,009, of Wilson, M., et al., filed Oct. 11, 2013.
Non-Final Office Action dated Sep. 30, 2011, for U.S. Appl. No. 13/010,976, of Babu, A. R., et al., filed Jan. 21, 2011.
Final Office Action dated Jun. 12, 2012, for U.S. Appl. No. 13/010,976, of Babu, A. R., et al., filed Jan. 21, 2011.
Advisory Action dated Aug. 24, 2012, for U.S. Appl. No. 13/010,976, of Babu, A. R., et al., filed Jan. 21, 2011.
Non-Final Office Action dated Aug. 15, 2014, for U.S. Appl. No. 13/010,976, of Babu, A. R., et al., filed Jan. 21, 2011.
Notice of Allowance dated Dec. 24, 2014, for U.S. Appl. No. 13/010,976, of Babu, A. R., et al., filed Jan. 21, 2011.
Non-Final Office Action dated Apr. 2, 2014, for U.S. Appl. No. 14/012,655, of McKelvey, J., filed Aug. 28, 2013.
Final Office Action dated Aug. 15, 2014, for U.S. Appl. No. 14/012,655, of McKelvey, J., filed Aug. 28, 2013.
Non-Final Office Action dated Jan. 20, 2015, for U.S. Appl. No. 14/012,655, of McKelvey, J., filed Aug. 28, 2013.
Notice of Allowance dated Sep. 1, 2015, for U.S. Appl. No. 13/298,487, of Babu, A., et al., filed Nov. 17, 2011.
Non-Final Office Action dated Apr. 29, 2013, for U.S. Appl. No. 13/298,487, of Babu, A., et al., filed Nov. 17, 2011.
Final Office Action dated Aug. 22, 2013, for U.S. Appl. No. 13/298,487, of Babu, A., et al., filed Nov. 17, 2011.
Advisory Action dated Oct. 22, 2013, for U.S. Appl. No. 13/298,487, of Babu, A., et al., filed Nov. 17, 2011.
Non-Final Office Action dated Aug. 21, 2014, for U.S. Appl. No. 13/298,487, of Babu, A., et al., filed Nov. 17, 2011.
Final Office Action dated Mar. 18, 2015, for U.S. Appl. No. 13/298,487, of Babu, A., et al., filed Nov. 17, 2011.
Non-Final Office Action dated Feb. 20, 2015, for U.S. Appl. No. 14/512,104, of Templeton, T., et al., filed Oct. 10, 2014.
International Search Report and Written Opinion for PCT Application No. PCT/US2010/052483, dated Jun. 10, 2011.
International Search Report and Written Opinion for PCT Application No. PCT/US2011/055386, dated Feb. 22, 2012.
European Search Report and Opinion for European Application No. 11833172.7, dated Apr. 22, 2014.
International Search Report and Written Opinion for PCT Application No. PCT/US2014/069788, dated May 14, 2015.

(56) References Cited

OTHER PUBLICATIONS

International Search Report and Written Opinion for PCT Application No. PCT/US2012/064782, dated Feb. 26, 2013.
International Search Report and Written Opinion for PCT Application No. PCT/US2010/052481, dated Jun. 23, 2011.
International Search Report and Written Opinion for PCT Application No. PCT/US2014/067074, dated Mar. 15, 2015.
Examination Report for Canadian Application No. 2,812,594, dated Feb. 24, 2015.
Examination Report No. 1 for Australian Application No. 201415781, dated Feb. 23, 2015.
"Review: Square, Inc. Square Credit Card Reader (2013)," iLounge, Retrieved from the Internet URL: http://www.ilounge.com/index.php/reviews/entry/square-inc.-square-credit-card-reader-2013/, on Jan. 16, 2014, pp. 3.
"TUAW The Unofficial Apple Weblog, Square credit card reader loses weight, gains accuracy", Retrieved from the Internet URL: http://www.tuaw.com/2013/12/09/square-credit-card--reader-loses-weight-gains-accuracy/, on Dec. 9, 2013, p. 1.
Examination Report No. 2 for Australian Application No. 201415781, dated Aug. 13, 2015 (Registration No. 359005).
Ryan, P., "Plug and Pay: A Gallery of 26 Mobile Card Readers," Aug. 20, 2013, Retrieved from the Internet URL: http://bankinnovation.net/2013/08/plug-and-pay-a-gallery-of-26-mobile-card-readers/, on Feb. 19, 2015, pp. 1-12.
Notification of Registration of a Design for Australian Application No. 201415781, dated Nov. 27, 2014 (Registration No. 359005).
First Examination Report for Indian Design Application No. 267386, dated Feb. 5, 2015.
Non-Final Office Action dated Apr. 25, 2013, for U.S. Appl. No. 13/298,491, of Lamba, K., et al., filed Nov. 17, 2011.
Final Office Action dated Sep. 17, 2013, for U.S. Appl. No. 13/298,491, of Lamba, K., et al., filed Nov. 17, 2011.
Advisory Action dated Oct. 22, 2013, for U.S. Appl. No. 13/298,491, of Lamba, K., et al., filed Nov. 17, 2011.
Non-Final Office Action dated Jul. 17, 2014, for U.S. Appl. No. 13/298,491, of Lamba, K., et al., filed Nov. 17, 2011.
Final Office Action dated Feb. 4, 2015, for U.S. Appl. No. 13/298,491, of Lamba, K., et al., filed Nov. 17, 2011.
Notice of Allowance dated Jun. 22, 2015, for U.S. Appl. No. 13/298,491, of Lamba, K., et al., filed Nov. 17, 2011.
Non-Final Office Action dated Jun. 6, 2014, for U.S. Appl. No. 14/231,598, of Wade, J., et al., filed Mar. 31, 2014.
Non-Final Office Action dated Apr. 10, 2015, for U.S. Appl. No. 14/189,997, of Lamfalusi, M., et al., filed Feb. 25, 2014.
Notice of Allowance dated Nov. 25, 2014, for U.S. Appl. No. 14/231,598, of Claude, J.B., et al., filed Mar. 31, 2014.
Non-Final Office Action dated Jun. 22, 2015, for U.S. Appl. No. 14/322,815, of Edwards, T., filed Jul. 2, 2014.
Notice of Allowance dated Aug. 1, 2014, for U.S. Appl. No. 14/203,463, of Wade, J., et al., filed Mar. 10, 2014.
Notice of Allowance dated Aug. 27, 2015, for U.S. Appl. No. 13/298,501, of Babu, A., et al., filed Nov. 17, 2011.
Non-Final Office Action dated Sep. 11, 2014, for U.S. Appl. No. 13/298,501, of Babu, A., et al., filed Nov. 17, 2011.
Final Office Action dated May 6, 2015, for U.S. Appl. No. 13/298,501, of Babu, A., et al., filed Nov. 17, 2011.
Notice of Allowance dated Oct. 17, 2014, for U.S. Appl. No. 14/220,967, of Wade, J., et al., filed Mar. 20, 2014.
Notice of Allowance dated Dec. 18, 2014, for U.S. Appl. No. 14/220,967, of Wade, J., et al., filed Mar. 20, 2014.
Notice of Allowance dated May 19, 2015, for U.S. Appl. No. 14/620,765, of Wade, J., et al., filed Feb. 12, 2015.
Non-Final Office Action dated May 26, 2015, for U.S. Appl. No. 14/551,681, of Wade, J., et al., filed Nov. 24, 2014.
Notice of Allowance dated Jun. 10, 2014, for U.S. Appl. No. 29/491,147, of Templeton T., et al., filed May 16, 2014.
Non-Final Office Action dated Sep. 11, 2014, for U.S. Appl. No. 13/298,506, of Lamba, K., et al., filed Nov. 17, 2011.

Final Office Action dated May 6, 2015, for U.S. Appl. No. 13/298,506, of Lamba, K., et al., filed Nov. 17, 2011.
Non-Final Office Action dated Sep. 30, 2011, for U.S. Appl. No. 13/005,822, of McKelvey, J., et al., filed Jan. 13, 2011.
Notice of Allowance dated Aug. 28, 2015, for U.S. Appl. No. 13/298,510, of Lamba, K. et al., filed Nov. 17, 2011.
Non-Final Office Action dated Sep. 11, 2014, for U.S. Appl. No. 13/298,510, of Lamba, K. et al., filed Nov. 17, 2011.
Final Office Action dated May 6, 2015, for U.S. Appl. No. 13/298,510, of Lamba, K. et al., filed Nov. 17, 2011.
Final Office Action dated Jul. 9, 2012, for U.S. Appl. No. 13/005,822, of McKelvey, J., et al., filed Jan. 13, 2011.
Non-Final Office Action dated Jun. 18, 2013, for U.S. Appl. No. 13/005,822, of McKelvey, J., et al., filed Jan. 13, 2011.
Non-Final Office Action dated Dec. 10, 2013, for U.S. Appl. No. 13/005,822 of McKelvey, J., et al., filed Jan. 13, 2011.
Non-Final Office Action dated Oct. 7, 2011, for U.S. Appl. No. 13/043,258, of McKelvey, J., filed Mar. 8, 2011.
Final Office Action dated Jul. 13, 2012, for U.S. Appl. No. 13/043,258, of McKelvey, J., filed Mar. 8, 2011.
Non-Final Office Action dated Dec. 11, 2013, for U.S. Appl. No. 13/043,258, of McKelvey, J., filed Mar. 8, 2011.
Notice of Allowance dated Jul. 1, 2014, for U.S. Appl. No. 13/043,258, of McKelvey, J., filed Mar. 8, 2011.
Advisory Action dated Aug. 15, 2012, for U.S. Appl. No. 13/043,258, of McKelvey, J., filed Mar. 8, 2011.
Advisory Action dated Aug. 17, 2012, for U.S. Appl. No. 13/005,822, of McKelvey, J.,et al., filed Jan. 13, 2011.
Notice of Allowance dated Jun. 24, 2014, for U.S. Appl. No. 13/005,822, of McKelvey, J., et al., filed Jan. 13, 2011.
Non-Final Office Action dated Oct. 7, 2014, for U.S. Appl. No. 13/298,534, of Lamba, K., et al., filed Nov. 17, 2011.
Final Office Action dated Apr. 8, 2015, for U.S. Appl. No. 13/298,534, of Lamba, K., et al., filed Nov. 17, 2011.
Final Office Action dated Sep. 6, 2013, for U.S. Appl. No. 13/298,560, of Lamba K. et al., filed Nov. 17, 2011.
Advisory Action dated Oct. 21, 2013, for U.S. Appl. No. 13/298,560 of Lamba K. et al., filed Nov. 17, 2011.
Final Office Action dated Aug. 15, 2013, for U.S. Appl. No. 13/043,263, of McKelvey, J., filed Mar. 8, 2011.
Advisory Action dated Nov. 8, 2013, for U.S. Appl. No. 13/043,263, of McKelvey, J., filed Mar. 8, 2011.
Non-Final Office Action dated Feb. 24, 2014, for U.S. Appl. No. 13/043,263, of McKelvey, J., filed Mar. 8, 2011.
Notice of Allowance dated Jul. 15, 2014, for U.S. Appl. No. 13/043,263, of McKelvey, J., filed Mar. 8, 2011.
Non-Final Office Action dated Jul. 22, 2014, for U.S. Appl. No. 13/298,560, of Lamba K. et al., filed Nov. 17, 2011.
Final Office Action dated Jan. 28, 2015, for U.S. Appl. No. 13/298,560, of Lamba K. et al., filed Nov. 17, 2011.
Non-Final Office Action dated Oct. 11, 2011, for U.S. Appl. No. 13/043,203, of McKelvey. J., et al., filed Mar. 8, 2011.
Final Office Action dated Jul. 6, 2012, for U.S. Appl. No. 13/043,203, of McKelvey. J., et al., filed Mar. 8, 2011.
Non-Final office Action dated Oct. 11, 2011, for U.S. Appl. No. 13/043,263, of McKelvey, J., filed Mar. 8, 2011.
Advisory Action dated Aug. 1, 2012, for U.S. Appl. No. 13/043,203, of McKelvey, J., filed Mar. 8, 2011.
Advisory Action dated Aug. 16, 2012, for U.S. Appl. No. 13/043,263, of McKelvey, J., filed Mar. 8,2011.
Non-Final Office Action dated Apr. 29, 2013, for U.S. Appl. No. 13/043,263, of McKelvey, J., filed Mar. 8, 2011.
Non-Final office Action dated Apr. 30, 2013, for U.S. Appl. No. 13/043,203, of McKelvey, J., filed Mar. 8, 2011.
Non-Final Office Action dated May 28, 2013, for U.S. Appl. No. 13/298,560, of Lamba K. et al., filed Nov. 17, 2011.
Notice of Allowance dated Jul. 9, 2013, for U.S. Appl. No. 13/043,203, of McKelvey, J., filed Mar. 8, 2011.
Non-Final Office Action dated Jul. 6, 2015, for U.S. Appl. No. 13/298,534, of Lamba K. et al., filed Nov. 17, 2011.
Advisory Action dated Apr. 9, 2015, for U.S. Appl. No. 13/298,560, of Lamba K. et al., filed Nov. 17, 2011.

(56) References Cited

OTHER PUBLICATIONS

Final office Action dated Jul. 9, 2012, for U.S. Appl. No. 13/043,263, of McKelvey, J., filed Mar. 8, 2011.
Non-Final Office Action dated Jul. 16, 2015, for U.S. Appl. No. 13/298,560, of Lamba K. et al., filed Nov. 17, 2011.
Application for Registration of an Industrial Design Examiner's Report for Canadian Design Application No. 159528, dated Jun. 11, 2015.
English-language translation of Notice of Reasons for Rejection for Japanese Application No. 2014-0255525, dated Mar. 31, 2015.
Certificate of Registration of Design for Indian Design Application No. 267386 mailed Nov. 14, 2014 (Registration No. 39149).
Non-Final Office Action dated Jul. 27, 2015, for U.S. Appl. No. 29/493,212, of Edwards, T., et al., filed Jun. 6, 2014.
English-language translation of Decision of Final Rejection for Japanese Patent Application No. 2013-533897, dated Feb. 23, 2015.
English-language translation of Office Action for Japanese Patent Application No. 2013-533897, dated Jun. 5, 2014.
English-language translation of Search Report for Japanese Patent Application No. 2013-533897, dated Apr. 14, 2014.
Certificate of Design Registration for European Patent Application No. 002578674, mailed Nov. 14, 2014 (Registration No. 002578674-0001).
Notice of Allowance dated Sep. 2, 2015, for U.S. Appl. No. 14/578,107, of Wade, J. et al., filed Dec. 19, 2014.
Advisory Action dated Sep. 11, 2015 for U.S. Appl. No. 13/298,506, of Lamba, K., et al., filed Nov. 17, 2011.
Notice of Allowance dated Sep. 16, 2015 for U.S. Appl. No. 14/551,681, of Wade, J., et al., filed Nov. 24, 2014.
Notice of Allowance dated Oct. 5, 2015 for U.S. Appl. No. 14/322,815, of Edwards, T., filed Jul. 2, 2014.
Notice of Allowance dated Oct. 6, 2015 for U.S. Appl. No. 13/298,491, of Lamba, K., et al., filed Nov. 17, 2011.
Notice of Allowance dated Oct. 7, 2015 for U.S. Appl. No. 13/298,510, of Lamba, K., et al., filed Nov. 17, 2011.
Notice of Allowance dated Oct. 8, 2015 for U.S. Appl. No. 13/298,487, of Lamba, K., et al., filed Nov. 17, 2011.
Notice of Allowance dated Oct. 13, 2015 for U.S. Appl. No. 14/578,107, of Wade, J., et al., filed Dec. 19, 2014.
Non-Final Office Action dated Oct. 29, 2015 for U.S. Appl. No. 14/512,104, of Templeton, T., et al., filed Oct. 10, 2014.
English-language translation of Final Rejection for Japanese Application No. 2014-025525, dated Oct. 20, 2015.
Notice of Allowance dated Nov. 13, 2015, for U.S. Appl. No. 13/298,487, of Lamba, K., et al., filed Nov. 17, 2011.
Corrected Notice of Allowance dated Nov. 18, 2015, for U.S. Appl. No. 14/578,107, of Wade, J., et al., filed Dec. 19, 2014.
Notice of Allowance dated Nov. 19, 2015, for U.S. Appl. No. 13/298,491, of Lamba, K., et al., filed Nov. 17, 2011.
Corrected Notice of Allowance dated Nov. 19, 2015, for U.S. Appl. No. 13/298,510, of Lamba, K., et al., filed Nov. 17, 2011.
Notice of Allowance dated Nov. 20, 2015, for U.S. Appl. No. 13/298,501, of Babu, A., et al., filed Nov. 17, 2011.
Ex parte Quayle Action dated Nov. 20, 2015, for U.S. Appl. No. 14/620,699, of Wade, J., et al., filed Feb. 12, 2015.
Notice of Allowance dated Nov. 23, 2015, for U.S. Appl. No. 14/189,997, of Lamfalusi, M., et al., filed Feb. 25, 2014.
Non-Final Office Action dated Dec. 14, 2015, for U.S. Appl. No. 13/298,506, of Lamba, K., et al., filed Nov. 17, 2011.
Notice of Allowance dated Jan. 12, 2016, for U.S. Appl. No. 13/298,534, of Lamba, K., et al., filed Nov. 17, 2011.
Final Office Action dated Jan. 15, 2016, for U.S. Appl. No. 29/493,212, of Edwards, T., et al., filed Jun. 6, 2014.
"What is a Coupling Capacitor," Retrieved from the Internet URL: http://www.learningaboutelectronics.com/Articles/What-is-a-coupling-capacitor, on Mar. 21, 2016, pp. 1-4.
Examiner's Report for Canadian Industrial Design Application No. 159528, dated Dec. 1, 2015.
Notice of Allowance dated Jan. 29, 2016, for U.S. Appl. No. 13/298,501, of Babu, A., et al., filed Nov. 17, 2011.
Notice of Allowance dated Jan. 29, 2016, for U.S. Appl. No. 13/298,534, of Lamba, K., et al., filed Nov. 17, 2011.
Final Office Action dated Feb. 1, 2016, for U.S. Appl. No. 13/298,560, of Lamba, K., et al., filed Nov. 17, 2011.
Notice of Allowance dated Feb. 5, 2016, for U.S. Appl. No. 14/620,699, of Wade, J., et al., filed Feb. 12, 2015.
Non-Final Office Action dated Feb. 25, 2016, for U.S. Appl. No. 14/979,407, of Lamfalusi, M., et al., filed Dec. 27, 2015.
Examiner Requisition for Canadian Application No. 2,812,594, dated Feb. 26, 2016.
Non-Final Office Action dated Mar. 1, 2016, for U.S. Appl. No. 14/942,515, of Lamba, K., et al., filed Nov. 16, 2015.
Notice of Allowance dated Mar. 28, 2016, for U.S. Appl. No. 29/493,212, of Edwards, T., et al., filed Jun. 6, 2014.
Non-Final Office Action dated Apr. 7, 2016, for U.S. Appl. No. 13/298,506, of Lamba, K., et al., filed Nov. 17, 2011.
Advisory Action dated Apr. 14, 2016, for U.S. Appl. No. 13/298,560, of Lamba, K., et al., filed Nov. 17, 2011.
Non-Final Office Action dated May 5, 2016, for U.S. Appl. No. 14/306,041, of Wade, J., et al., filed Jun. 16, 2014.
Non-Final Office Action dated May 6, 2016, for U.S. Appl. No. 14/512,104, of Templeton, T., et al., filed Oct. 10, 2014.
Notice of Allowance dated May 10, 2016, for U.S. Appl. No. 14/942,515, of Lamba, K., et al., filed Nov. 16, 2015.
Non-Final Office Action dated May 19, 2016, for U.S. Appl. No. 13/298,560, of Lamba, K., et al., filed Nov. 17, 2011.
Office Action for Canadian Patent Application No. 2,920,589, dated Mar. 11, 2016.
Office Action for European Patent Application No. 11 833 172.7, dated May 17, 2016.
Notice of Allowance dated Jun. 3, 2016, for U.S. Appl. No. 14/942,515, of Lamba, K., et al., filed Nov. 16, 2015.
Notice of Allowance dated Jun. 13, 2016, for U.S. Appl. No. 14/979,407, of Lamfalusi, M., et al., filed Dec. 27, 2015.
Notice of Allowance dated Jun. 14, 2016, for U.S. Appl. No. 14/942,515, of Lamba, K., et al., filed Nov. 16, 2015.
Certificate of Design Registration for Japanese Design Application No. 2014-255525, mailed on Jun. 24, 2016 (Registration No. 1554745).
Non-Final Office Action dated Jun. 30, 2016 for U.S. Appl. No. 15/066,496, of Babu, A., et al., filed Mar. 10, 2016.
Notice of Acceptance for Australian Patent Application No. 2014362287, dated Jun. 30, 2016.
Non-Final Office Action dated Jul. 1, 2016, for U.S. Appl. No. 15/013,937, of Lamba, K., et al., filed Feb. 2, 2016.
Office Action for Canadian Patent Application No. 2,932,849, dated Jul. 13, 2016.
Notice of Allowance dated Jul. 14, 2016, for U.S. Appl. No. 14/942,515, of Lamba, K., et al., filed Nov. 16, 2015.
Office Action for Brazilian Design Application No. 3020140057308, dated Jul. 26, 2016.
Non-Final Office Action dated Aug. 16, 2016, for U.S. Appl. No. 14/312,524, of Edwards, T., filed Jun. 23, 2014.
Non-Final Office Action dated Aug. 17, 2016, for U.S. Appl. No. 14/985,624, of Wade, J., et al., filed Dec. 31, 2015.
Notice of Allowance dated Aug. 26, 2016, for U.S. Appl. No. 13/298,506, of Lamba, K., et al., filed Nov. 17, 2011.
Notice of Allowance dated Sep. 22, 2016, for U.S. Appl. No. 13/298,506, of Lamba, K., et al., filed Nov. 17, 2011.
Notice of Allowance dated Sep. 27, 2016, for U.S. Appl. No. 14/306,041, of Wade, J., et al., filed Jun. 16, 2014.
Notice of Allowance dated Oct. 7, 2016, for U.S. Appl. No. 14/512,104, of Templeton, T., et al., filed Oct. 10, 2014.
Extended European Search Report for European Patent Application No. 16155374.8, dated Oct. 11, 2016.
Notice of Allowance dated Oct. 26, 2016, for U.S. Appl. No. 15/013,937, of Lamba, K., et al., filed Feb. 2, 2016.
Corrected Notice of Allowance dated Nov. 1, 2016, for U.S. Appl. No. 14/512,104, of Templeton, T., et al., filed Oct. 10, 2014.
Final Office Action dated Nov. 3, 2016, for U.S. Appl. No. 13/298,560, of Lamba, K., et al., filed Nov. 17, 2011.

(56) References Cited

OTHER PUBLICATIONS

International Search Report and Written Opinion, for PCT Application No. PCT/US2015/045772, dated Nov. 6, 2015.
Notice of Allowance for Canadian Application No. 2,920,589, dated Sep. 21, 2016.
Notice of Allowance dated Dec. 19, 2016, for U.S. Appl. No. 14/306,041, of Wade, J., filed Jun. 16, 2014.
Notice of Allowance dated Jan. 12, 2017, for U.S. Appl. No. 14/985,624, of Wade, J., et al., filed Dec. 31, 2015.
Non-Final Office Action dated Jan. 17, 2017, for U.S. Appl. No. 14/463,455, of Skoog, L., filed Aug. 19, 2014.
Non-Final Office Action dated Feb. 15, 2017, for U.S. Appl. No. 15/066,496, of Babu, A., et al., filed Mar. 10, 2016.
Advisory Action dated Feb. 21, 2017, for U.S. Appl. No. 13/298,560, of Lamba, K., et al., filed Nov. 17, 2011.
Final Office Action dated Feb. 23, 2017, for U.S. Appl. No. 14/312,524, of Edwards, T., filed Jun. 23, 2014.
Certificate of Industrial Design Registration for Canadian Design Application No. 166511, mailed Feb. 27, 2017.
Certificate of Industrial Design Registration for Canadian Design Application No. 159528, mailed Feb. 27, 2017.
Notice of Allowance for Canadian Patent Application No. 2,932,849, dated Mar. 27, 2017.
Corrected Notice of Allowance dated Apr. 10, 2017, for U.S. Appl. No. 14/985,624, of Wade, J., et al., filed Dec. 31, 2015.
English-language translation of First Office Action and Search for Chinese Patent Application No. 201510109013.7, dated Sep. 5, 2017.
Office Action for European Patent Application No. 16155374.8, dated Oct. 18, 2017.
Office Action for European Patent Application No. 11833172.7, dated Oct. 24, 2017.
Non-Final Office Action dated Jul. 28, 2017, for U.S. Appl. No. 15/252,033, of Lamba, K., et al., filed Aug. 30, 2016.
Ex Parte Quayle Action mailed Sep. 8, 2017, for U.S. Appl. No. 15/066,496, of Babu, A., et al., filed Mar. 10, 2016.
Notice of Allowance dated Sep. 28, 2017, for U.S. Appl. No. 15/013,964, of Lamba, K., et al., filed Feb. 2, 2016.
English-language translation of Office Action for Chinese Patent Application No. 201080051400.5, dated Sep. 3, 2014.
Notice of Allowance dated May 5, 2017, for U.S. Appl. No. 14/312,524, of Edwards, T., filed Jun. 23, 2014.
Non-Final Office Action dated May 8, 2017, for U.S. Appl. No. 15/013,964, of Lamba, K., et al., filed Feb. 2, 2016.
Notice of Allowance dated Jun. 22, 2017, for U.S. Appl. No. 14/463,455, of Skoog, L., filed Aug. 19, 2014.
Notice of Allowance dated Jan. 18, 2018, for U.S. Appl. No. 15/066,496, of Babu, A., et al., filed Mar. 10, 2016.
Final Office Action dated Jan. 29, 2018, for U.S. Appl. No. 15/252,033, of Lamba, K., et al., filed Aug. 30, 2016.
Corrected Notice of Allowance dated Feb. 9, 2018, for U.S. Appl. No. 15/066,496, of Babu, A., et al., filed Mar. 10, 2016.

\* cited by examiner

MULTI-PERIPHERAL HOST DEVICE

BACKGROUND

Consumers can interact with merchants to conduct various financial payment transactions. For example, a consumer can conduct a transaction with a merchant at a point-of-sale system using cash, a transaction card, or other transaction instrument. Conventional systems can include expensive and bulky financial transaction electronics, as may include a card reader for payment cards (e.g., debit or credit cards), a cash drawer, monitors, keyboards, and various other electronic devices. Oftentimes, however, this equipment can be costly and large, requiring additional space and resources. Further, in retail stores where space is limited, a merchant may not require all components that come with conventional point-of-sale system or at least may find it desirable to piece together a modular or mobile system to streamline the checkout experience. Further still, merchants may find approaches to conducting a financial transaction using conventional systems burdensome, where during a transaction, if a customer pays by credit card, the merchant has to enter a transaction amount and the merchant or the customer has to swipe the credit card in the card reader. Further, many transactions require that the customer sign a physical receipt, electronically approve a transaction, e.g., by pressing an approve button on a user interface, electronically sign for the transaction, e.g., with a stylus or finger on an electronic signature capture device with a touch sensitive pad, or enter an authorizing personal identification number (PIN), many of which techniques require additional financial transaction electronics and time.

BRIEF DESCRIPTION OF THE DRAWINGS

In order to describe the manner in which features of the disclosure can be obtained, a more particular description of the principles will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Systems and methods in accordance with various embodiments of the present disclosure overcome one or more of the above-referenced and other deficiencies in conventional approaches to conducting financial transactions. In particular, in accordance with various embodiments, approaches provide for a mobile or otherwise modular point-of-sale system configured to facilitate the transfer of funds between entities (e.g., customers and merchants).

For example, in accordance with various embodiments, a portable computing device (e.g., a mobile phone, a tablet computer, etc.) that runs a merchant application or other software can be provided, where the device and software can provide functionality for a point-of-sale system. The device can be connected through a hub to one or more peripheral components such as a financial transaction electronic device including a card reader, a signature pad, a pin entry device, a controllable cash drawer, a receipt printer, a bar code reader, or other financial transaction devices. The hub can be positioned remote from a cradle or other support structure that supports or otherwise holds the portable computing device. The hub can include, for example, a first connector and cable configured to provide power and data to the portable computing device and a second connector and cable configured to receive power from a power source. In accordance with various embodiments, the data can include data acquired from the financial peripheral components or data acquired from the computing device, such as data based on a point-of-sale transaction.

The hub can further include a portable computing device port configured to couple the hub to the portable computing device using the first connector and cable, and a plurality of client peripheral ports, each client peripheral port configured to couple to one of a plurality of peripheral components. The hub can include a host including a processor and an enclosure surrounding at least the electronics and the second connector, where the host can be configured to host at least one of the plurality of client peripheral ports and operate as a single client to the portable computing device. Advantageously, such a mobile point-of-sale system tends to be less bulky and expensive than a conventional point-of-sale system, which can include a computer, a cash drawer, a receipt printer, a display, a bar code reader, specialized keyboards, among other financial devices.

Figure 1:
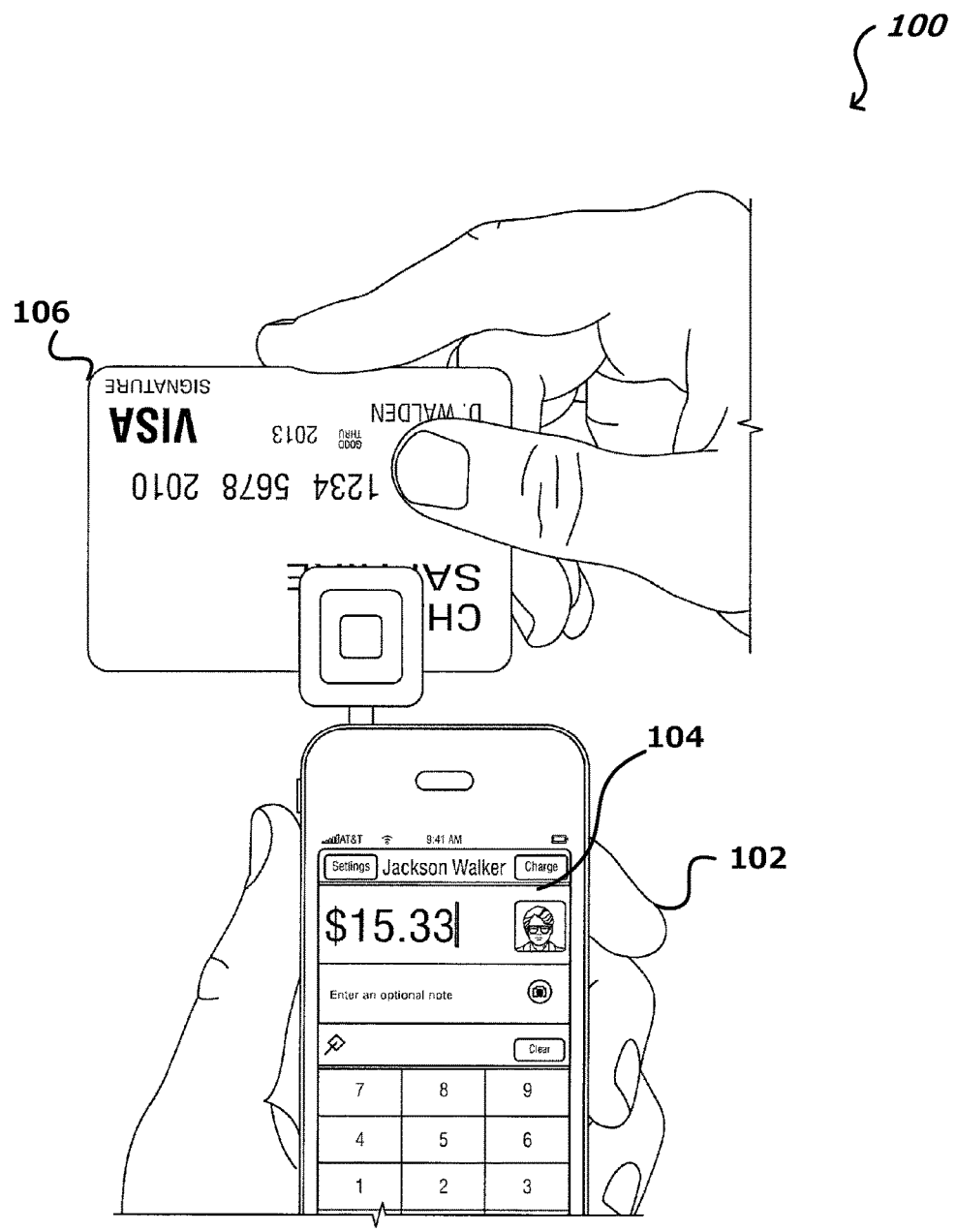
FIG. 1 illustrates an example situation of a customer interacting with a merchant to conduct a financial payment transaction in accordance with various embodiments.

Other advantages, variations, and functions are described and suggested below as may be provided in accordance with the various embodiments. FIG. 1 illustrates an example situation 100 of a user 102 interacting with a merchant to conduct a financial payment transaction ("transaction"). In this example, the user 102 is shown conducting a transaction with a merchant at a point-of-sale register using a payment card, e.g., a credit card. It should be noted that although the user is shown conducting a transaction using a payment card, in various embodiments, transactions can be conducted through a card-less payment account that is linked to the payment card. Other transactions include person-to-person, account-to-account, electronic cash, among others. These payment instruments are usually associated with an established consumer account. It should be further noted that although a credit card is shown to conduct transactions, approaches described herein apply to other types of financial payment instruments including, for example, debit cards, and card-less payment accounts. As described, in conventional point-of-sale systems, the equipment used can be costly and large, requiring additional space and resources. Further, in retail stores where space is limited, a merchant may not require all components that come with a conventional point-of-sale system or at least may find it desirable to piece together a modular or mobile system to streamline the checkout experience. Further still, in some embodiments, the computing device may only be capable of supporting a single peripheral device due to the device only having one physical interface, such as is the situation with many mobile phones and/or table computers. Further, these computing devices might also be coupled with communication protocols or terms of use that prohibit the computing device from acting as a host to multiple peripheral devices. Accordingly, in accordance with various embodiments, approaches provide for mobile or otherwise modular point-of-sale system that includes a hub or other device configured to host at least one of the plurality of client peripheral ports and/or operate as a single client to the portable computing device to facilitate a financial payment transaction between entities (e.g., customers and merchants).

Figure 2:
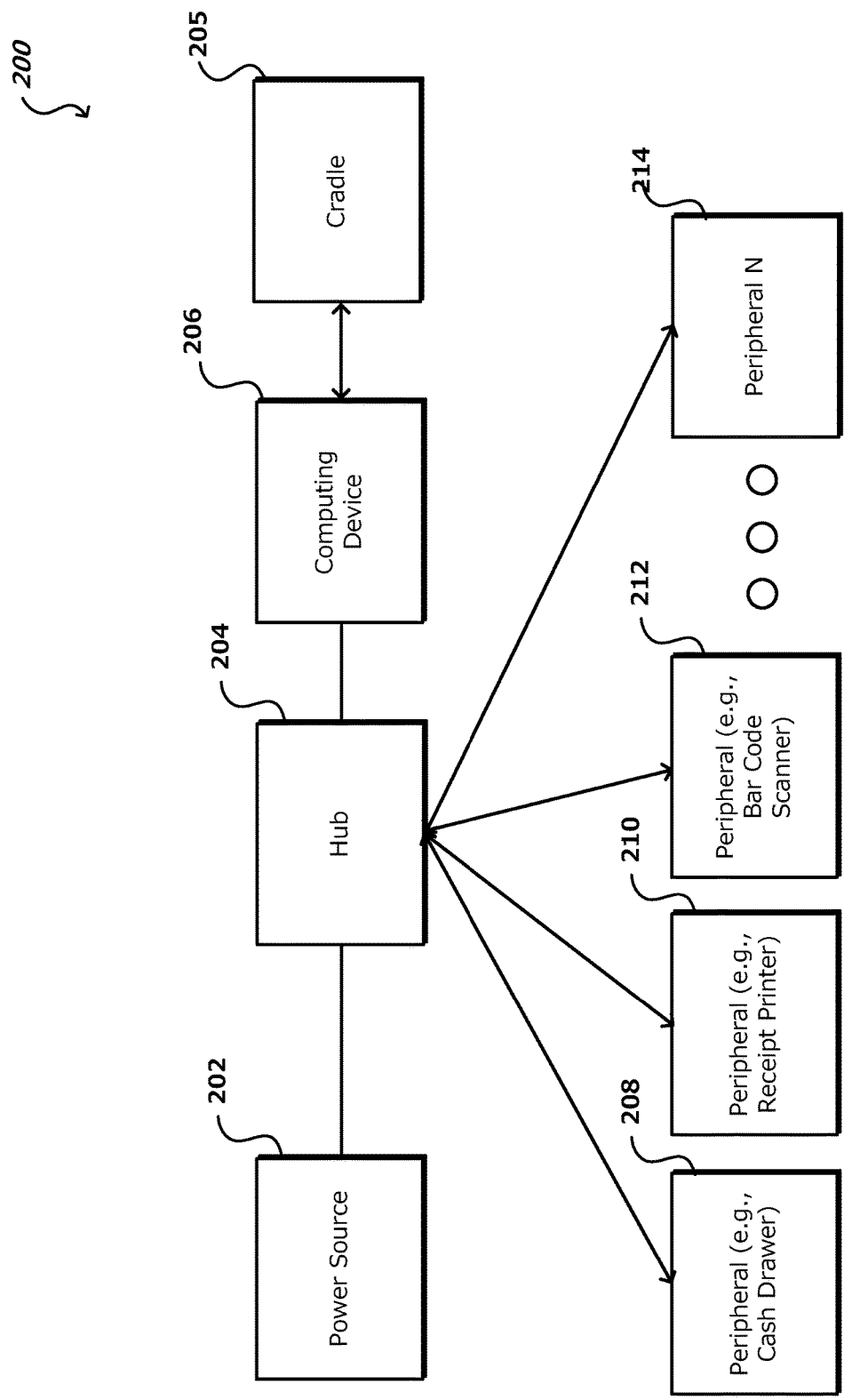
FIG. 2 illustrates an example block diagram of a point-of-sale system in accordance with an embodiment.

FIG. 2 illustrates an example block diagram 200 of a point-of-sale system in accordance with various embodiments. As shown in FIG. 2, a computing device (e.g., a mobile phone, a tablet computer, etc.) 206 can be in communication with a hub 204. The computing device can include, for example, a processor, a touch-screen display, a wireless local area network transceiver, a physical interface for electronic communication, and a physical interface to receive power (which can be integrated with the physical interface for electronic communication, e.g., in a Universal Serial Bus (USB) connector or other propriety connector).

The computing device can run a merchant application or other financial transaction software that can provide functionality to facilitate a point-of-sale such as by enabling payment transactions. For example, in accordance with various embodiments, the merchant application can be downloaded and installed on the computing device. The software can be configured to operate with a card reader, where an individual can complete a financial transaction by swiping a magnetic stripe card through the card reader connected to the computing device. In this example, the financial transaction can be any transaction that involves receiving or sending payment from one person to another. The magnetic stripe card can be, for example, a credit card, a debit card, or other types of payment authenticating pieces capable of carrying out the financial transaction. In accordance with various embodiments, the size of the card reader is miniaturized to be portable for connection with the computing device. The card reader is configured to reliably read data encoded in a magnetic strip of the card with minimum error in a single swipe and provide a signal that corresponds to the data read to the computing device, which then decodes the incoming signal from the card reader and acts as a point-of-sale device to complete the financial transaction.

In accordance with various embodiments, the financial transaction card reader device can include a housing having a slot for swiping a magnetic stripe of a financial transaction card to complete the financial transaction. A read head in the housing reads data stored on the magnetic stripe and produces a signal indicative of data stored on the magnetic stripe. An output jack is adapted to be inserted into a microphone input associated with the computing device for providing the signal indicative of data stored on the magnetic stripe to the computing device, where the signal is then decoded in the computing device.

In accordance with various embodiments, the computing device can be supported and detachably secured to a stand or cradle 205. The stand can include, for example, any structure capable of holding or otherwise supporting the computing device. In various embodiments, the stand can be part of a point-of-sale system that is prominently viewable by a customer. The hub can be positioned remote the stand, cradle, or other support structure that supports or otherwise holds the computing device.

The computing device can connect to one or more peripheral components (208, 210, 212, and 214) or other devices through the hub 204. The peripheral components can include a financial transaction electronic device including a card reader, a signature pad, a pin entry device, a controllable cash drawer, a receipt printer, a bar code reader, or other financial transaction devices. The peripheral components can couple to the hub, for example, via a plurality of client peripheral ports. In accordance with various embodiments, the plurality of client peripheral ports can include USB ports, FireWire ports, Lightning ports, etc., and a financial peripheral component can connect to the hub via an appropriate connector.

The hub can include a computing device port that connects to a first connector and cable configured to couple the hub to a computing device, where the first connector and cable can provide power and data to the computing device. In accordance with various embodiments, the data can include data from the peripheral components to the computing device or data from the computing device to the peripheral components, such as data based on a point-of-sale transaction. It should be noted that any number of cables and connectors can be used to couple the hub to the computing device. Example connectors include USB connectors, FireWire connectors, Lightning connectors, etc. The hub can connect to a power source 202 via a second connector and cable and can receive power from the power source. It should be noted that the first connector can connect to any number of devices provided by any number of manufacturers. In this way, the hub acts as a communication bridge between the computing device and the peripherals connected to the hub.

The hub can further include, for example, a host including a processor and an enclosure surrounding at least the electronics and the connectors, where the host can be configured to host at least one of the plurality of client peripheral ports and operate as a single client to the computing device. In accordance with various embodiments, operating as a single client to the computing device enables the hub to host, manage, and/or otherwise independently interact with a connected peripheral component. In this way, the hub includes the necessary software and hardware to host one or more peripheral components independent of the portable computing device. Because the hub is both the host to the multiple peripheral devices, and the single client to the computing device, the hub facilitates the use of multiple peripheral devices even with computing devices that utilize protocols or policies that prohibit the computing device acting as a host to multiple peripheral devices. Further, many computing devices, especially mobile phones and tablets, utilize proprietary communication protocols for devices communicating with the computing device via a physical data port. In such embodiments, the processor is further configured to format communications according to an acceptable format to comply with the communication protocol of the computing device.

As described, in some implementations, the hub can connect the computing device to a cash drawer. The cash drawer is a structure that includes electronics to interface with the computing device and can be controlled by the computing device via the hub. For example, the computing device can send a signal to the hub to control whether to open the cash drawer. In this example, when conducting a transaction, a merchant application running on the computing device can choose to process a payment with cash or card. If a cash payment is selected, the application can send a signal to the host which can open the cash drawer. When the cash drawer closes, the cash drawer can send a signal to the host, which can notify the application running on the computing device.

In some implementations, the hub can connect the computing device to a receipt printer. In this situation, the computing device can send data to the printer through the hub. For example, the computing device can be a merchant device that conducts payment transactions with a customer and the computing device can send receipt data to the hub. The hub, in turn, can send the receipt data to the printer. The printer can receive the receipt data and print a receipt based on the receipt data. In accordance with various embodiments, the printer can be a commercially available receipt printer with a USB connector that will plug into the hub.

In some implementations, the hub can connect the computing device to a bar code reader. The bar code reader can, for example, be a commercially available bar code reader with a USB connector that will plug into the hub. A merchant can scan a barcode with the connected bar code reader and the hub can send the signals from the bar code reader to the computing device.

In various embodiments, the hub can connect to a financial transaction card reader. As described, the financial transaction card reader can be connected to the computing device, but in various embodiments a merchant may decide to connect the card reader to the hub. In the situation where the merchant decides to connect the card reader to the hub, the card reader can include, for example, appropriate ports and cables necessary to connect to the hub. The hub can include appropriate circuitry to process a signal indicative of data stored on the magnetic stripe, such as by providing the signal to the computing device. For example, a read head of the card reader can read data stored on a magnetic stripe of a financial transaction card and can produce a signal indicative of the data stored on the magnetic stripe. The signal can be provided to the hub over an appropriate cable and connector. The hub can provide the signal indicative of data stored on the magnetic stripe, encrypted or otherwise, to the computing device for further processing. The computing device can decode the signal from the hub and acts as a point-of-sale device to complete the financial transaction.

Accordingly, in accordance with various embodiments, the computing device in communication with the hub can act as a point-of-sale system. For example, the computing device can run a merchant application to process transactions. This can include, for example, scanning items, where the merchant application causes the computing device to act as a merchant-facing device. Alternatively, the merchant application can display items for purchase on the screen of the computing device and process various user-selections on the display element of the computing device. Once item scanning or item selection is complete, the computing device can calculate a total amount due, e.g., including tax and/or tip, and display the total amount to the user. The application then can display a prompt to receive a customer's signature, customer personal identification number (PIN) or other form of authorization or authentication for the transaction. When the merchant sees the prompt, the merchant can swivel the stand to face the computing device towards the customer. After the customer approves the transaction, signs on the touchpad of the computing device, the computing device can display, to the customer, different methods of obtaining a receipt. For example, the methods include printing the receipt, emailing the receipt to an email of the customer, or allowing the customer an option to skip the receipt process.

Figure 3:
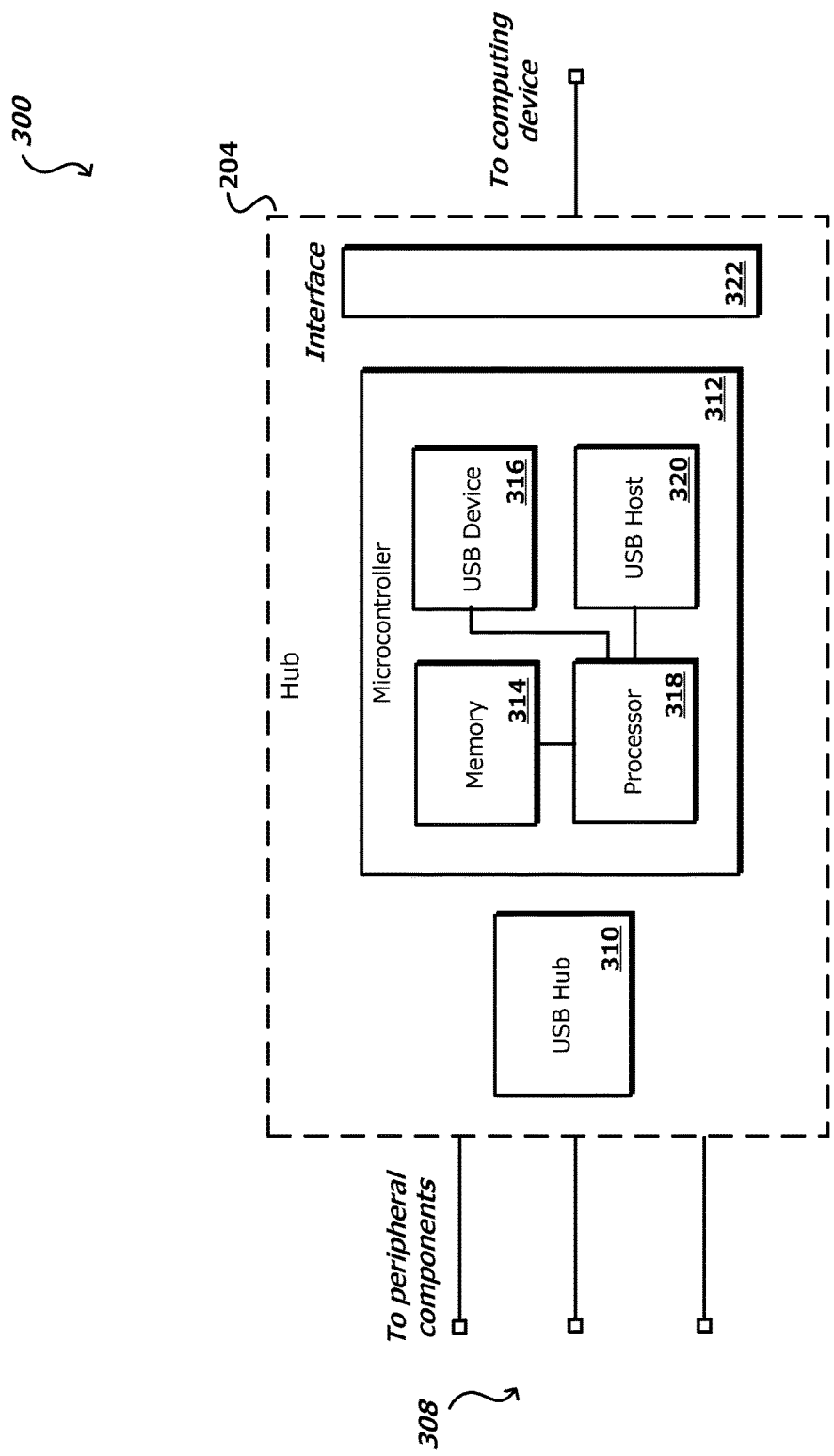
FIG. 3 illustrates an example block diagram of a component of a point-of-sale system in accordance with an embodiment.

FIG. 3 illustrates a detailed view of hub 204 of FIG. 2 in accordance with various embodiments. As shown in example 300 of FIG. 3, hub 204 includes, for example, a universal serial bus (USB) hub 310, a microcontroller 312, and an interface layer 322. The microcontroller can include or be in communication with, for example, a memory component 314, a USB device peripheral 316, a processor component 318, and a USB host peripheral 320. In accordance with various embodiments, the USB hub can, for example, expand a single USB port into several USB ports so that there are more ports available to connect devices to the computing device. As shown in FIG. 3, the USB hub expands to at least three USB ports 308 and these ports can be used to connect to peripheral components.

As shown in FIG. 3, the hub includes a processor 318 for executing instructions that can be stored in a memory device or element 314. The processor can further control communications between the computing device and peripheral components (e.g., a receipt printer, a cash drawer, etc.). As would be apparent to one of ordinary skill in the art, the hub can include many types of memory, data storage, or non-transitory computer-readable storage media, such as a data storage for program instructions for execution by the processor, a separate storage for images or data, a removable memory for sharing information with other devices, etc.

The hub also includes USB device component peripheral 316 for connecting with the computing device via, for example, the first connector and cable. For example, the USB device peripheral can connect with a USB host on the computing device. In various embodiments, the USB device component communicates with the USB host on the computing device through at least one interface layer. In accordance with various embodiments, the interface layer can include a set of APIs (or other such interfaces) for receiving calls or requests from across the first connector and cable. Each API can be provided to receive requests for at least one specific action to be performed with respect to the peripheral components. Upon receiving a request to one of the APIs, the hub can parse or otherwise analyze the request to determine the steps or actions needed to act on or process the request. For example, a request might be received that includes a request to print a receipt. In this example, the hub can parse the request to determine the type of hardware requested (if any), or other such aspects. Information for the request can be written to a data store, or other appropriate storage location or job queue, for subsequent processing.

In accordance with various embodiments, the USB host peripheral 320 may implement multiple host controllers and each host controller can provide one or more USB ports. In the example shown, at least three USB ports can be hosted. As described, various peripheral components can be connected to the ports and can communicate with the computing device via the hub.

In accordance with various embodiments the hub can be associated with a unique identification number and software running on the computing device can determine whether the computing device is correctly paired with the hub. For example, the computing device can access the unique identification number and can determine whether the hub is correctly paired with the software running on the computing device. In other implementations, the computing device accesses the unique identification number from the host and the unique identification number associated with the host and an identification number associated with the software can be sent to a remote server, where the remote server can determine whether the hub is paired with an authorized computing device. In the situation where the unique identification numbers do not complement each other, the computing device (or remote server) can perform at least one of notifying an external system of suspicious activity, e.g., a payment service system, or preventing at least one operation or function associated with the point-of-sale system. The at least one operation can include, for example, preventing a cash drawer from opening, voiding a transaction, requiring a password or other credentials to gain access to the merchant software, etc. Such actions can deter fraud involving, for example, the drawer, where the system can detect switching of a cash-filled drawer with an empty drawer. In the situation where the unique identification numbers do complement each other, the financial transaction can proceed.

In some embodiments, the hub can include additional components. For example, the hub can include one or more network interface elements for communicating over various networks, such as a Wi-Fi, Bluetooth, RF, wired, or wireless communication systems. The hub in many embodiments can communicate with a network, such as the Internet, and may be able to communicate with other such devices. Accordingly, in accordance with various embodiments, the peripheral components capable of being connected to the hub and controlled by the computing device can be updated. For example, configuration information can be received over the network via a service provider. The configuration information can be received at the computing device and can be communicated to the hub. The configuration information can, for example, enable the operation of additional peripheral components with the computing device through the hub. This can include, for example, updating the firmware or other software stored on the hub such that the hub can be configured to process data from at least one additional peripheral component. In certain embodiments, the configuration information can be stored to a memory component and accessed by the hub. In certain embodiments, the updating and/or providing of software to support additional and/or current devices can occur, for example, as a background process where user interaction is not required.

In various other embodiments, a plurality of networked hubs can interact with one another in completing a financial or other transaction. For example, a first hub can include a network interface element or other networking component to communicate with a second hub, where the second hub is not connected to a computing device. However, in various embodiments the second hub can be connected to a computing device. In this example, data received from at least one peripheral component connected to the second hub can be provided to the first hub and processed by the computing device connected to the first hub. For example, a bar code scanner connected to the second hub can scan a barcode. Information received from the bar code scanner can be communicated from the second hub to the first hub. The first hub can provide the information to the computing device and the computing device can process the information accordingly.

In certain embodiments, a plurality of computing devices can be connected to a single hub. In this example, the hub can include a multiplexer configured to connect the computing device to a plurality of computing devices, each of the plurality of computing devices configured to access a peripheral component connected to a respective one of the plurality of client peripheral ports. For example, a first computing device connected to the hub can operate a cash drawer connected to hub, a second computing device can operate a receipt printer connected to the hub, and a third computing device can also operate the cash drawer. In this example, the hub includes the appropriate electronics and software to select between the computing devices and process information between the computing devices and connected peripheral components.

Figure 4A:
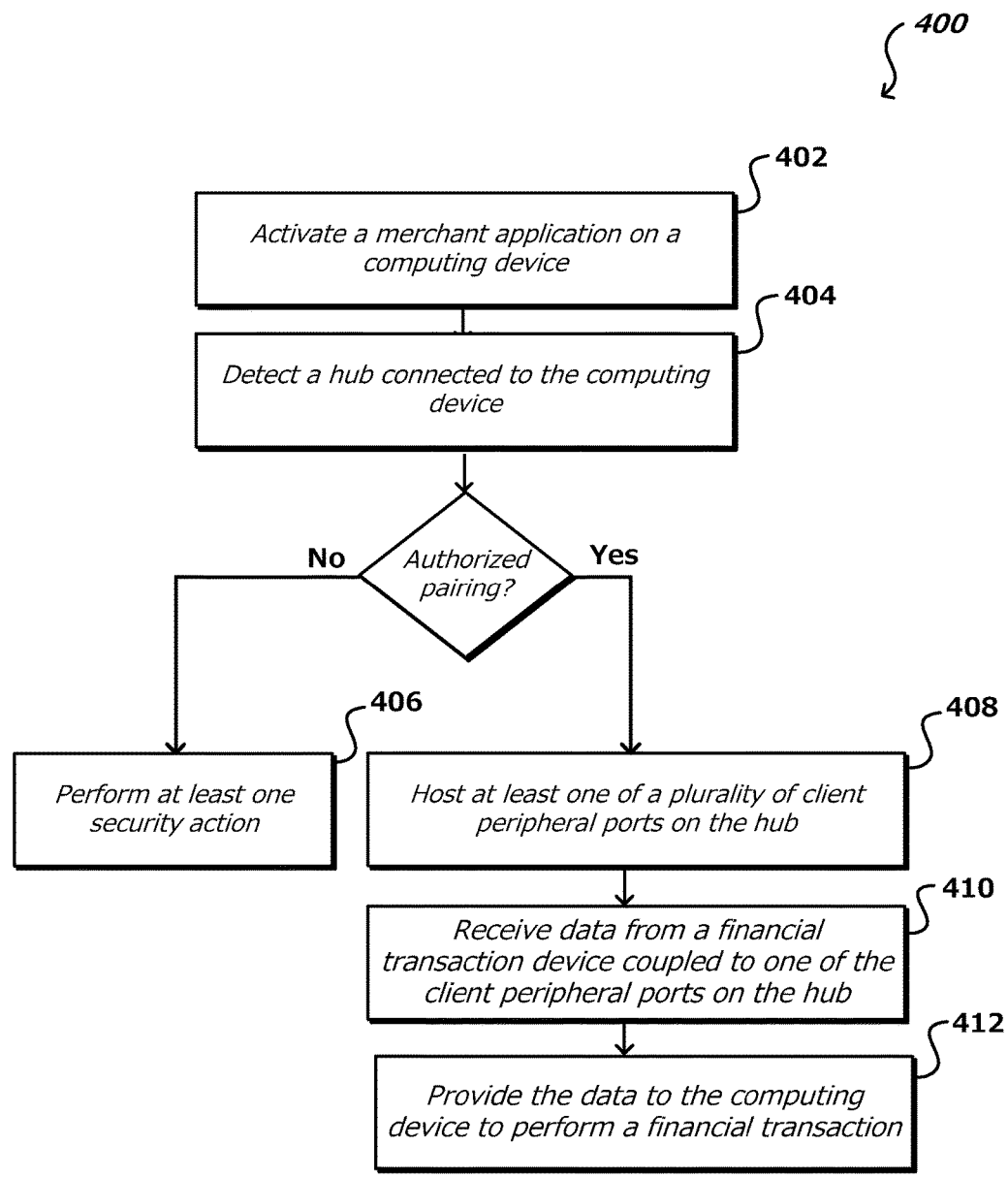
FIGS. 4A-4C illustrate an example process for conducting a financial payment transaction in accordance with various embodiments.

FIG. 4A illustrates an example process 400 for conducting a financial payment transaction utilizing a point-of-sale system, in accordance with various embodiments. A portable computing device (e.g., a mobile phone, a tablet computer, etc.) configured to run a merchant application or other software can be provided. The merchant application can be activated 402, where the device and application provide functionality for a point-of-sale system. The computing device can detect 404 a hub, where the computing device can be connected through the hub to one or more peripheral components, such as a controllable cash drawer, a printer, a bar code reader, or other financial transaction electronic device. The hub can be positioned remote from a cradle or other support structure that supports or otherwise holds the portable computing device. The hub can include, for example, a first connector configured to provide power and data to the portable computing device and a second connector configured to receive power from a power source. The data can include data from the peripheral components for or data from the computing device, such as data based on a point-of-sale transaction. The hub can further include a portable computing device port configured to couple the hub to the portable computing device and a plurality of client peripheral ports, each client peripheral port configured to couple to one of a plurality of financial transaction devices. Further, the hub can include a host including a processor and an enclosure surrounding the electronics and the second connector, where the host can be configured to host at least one of the plurality of client peripheral ports, the host further being configured operate as a single client to the portable computing device.

During operation, the computing device can verify 404 that the hub and computing device are an authorized pair. For example, the hub can be associated with a unique identification number and software running on the computing device can determine whether the computing device is paired or otherwise authorized to operate with the hub by comparing the unique identification number associated with the hub to a stored identification number of the hub on the computing device. In the situation where the hub and computing device are not an authorized pair, for example, the unique identification numbers do not match, the computing device can perform 406 at least one security action. This can include, for example, contacting a security service, blocking access to the software, preventing at least one peripheral connected to the hub from operating, among other such actions.

In the situation where the hub and computing device are an authorized pair, for example, the unique identification numbers match, at least one of a plurality of client peripheral ports of the host can be hosted 408, where the plurality of client peripheral ports can be configured to couple to one of the plurality of financial transaction devices. In this way, at least one of the electronic devices can be controlled by the computing device. For example, data can be received 410 from one of the plurality of electronic devices connected to a respective client peripheral port of the host device and the data can be provided 412 to the computing device via a port configured to couple the host device to the portable computing device to perform at least one financial transaction.

For example, the data received can be processed by the hub into a signal acceptable to be transmitted using the first connector and readable by the computing device. In various other embodiments, the computing device can control at least one peripheral component through the hub. For example, the computing device can send a signal to the hub to control whether to open a cash drawer. In this example, when conducting a transaction, a merchant application running on the computing device can choose to process payment with cash or card. If a cash payment is selected, the application can send a signal to the host which can open the cash drawer. When the cash drawer closes, the cash drawer can send a signal to the host, which can notify the application running on the computing device. In another example, the hub can connect the computing device to a bar code reader. In this example, a merchant can scan a barcode with the connected bar code reader and the hub can send the signals from the bar code reader to the computing device.

Figure 4B:
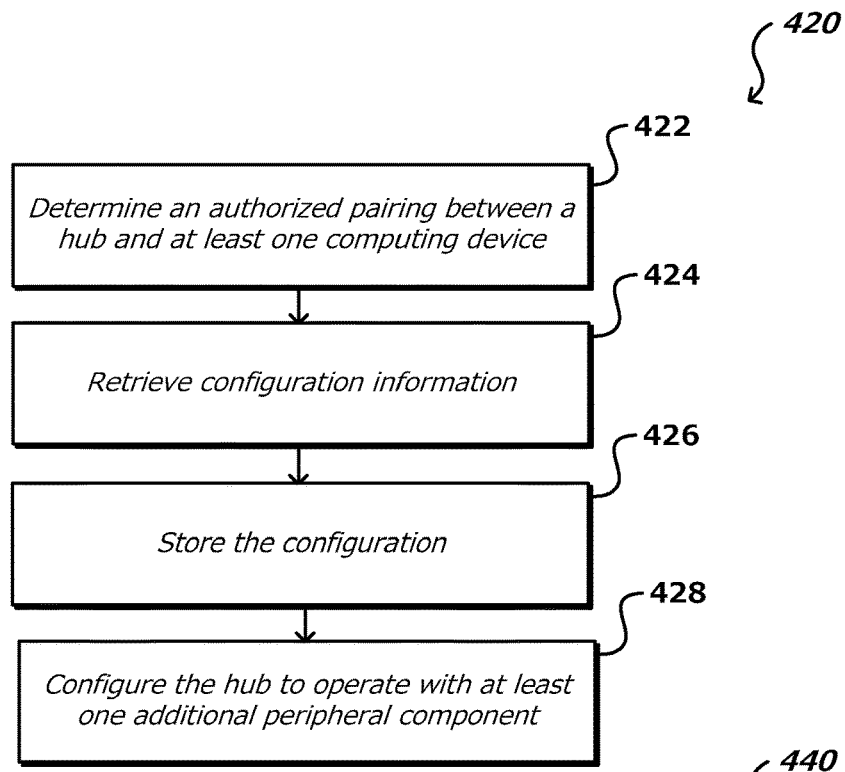

FIG. 4B illustrates an example process 420 for updating components of a point-of-sale system, in accordance with various embodiments. As described, a hub as described herein can include additional components such as one or more network interface elements for communicating over various networks. The hub in many embodiments can communicate with a network, such as the Internet, and may be able to communicate with other such devices. Accordingly, in accordance with various embodiments, the peripheral components capable of being connected to the hub and controlled by the computing device can be updated. For example, once the computing device determines 420 an authorized pairing between the hub and at least one computing device, configuration information can be retrieved 422 over the network from a service provider. The configuration information can be received at the computing device and can be communicated to the hub and stored 424. The configuration information can, for example, enable the operation of additional peripheral components with the computing device through the hub. This can include, for example, updating or otherwise configuring 426 the firmware or other software stored on the hub such that the hub can be configured to process data from at least one additional peripheral component. In certain embodiments, the updating and/or providing of software to support additional and/or current devices can occur, for example, as a background process, where user interaction is not required.

Figure 4C:
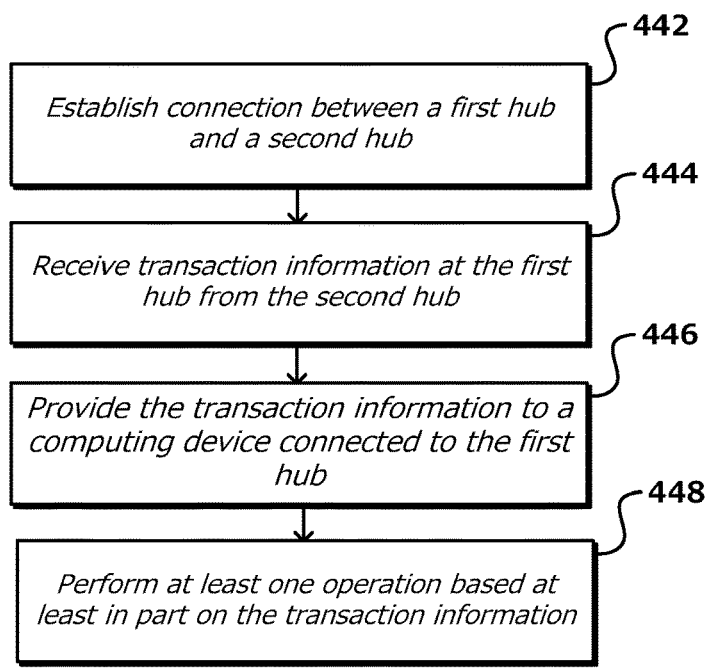

FIG. 4C illustrates an example process 440 for conducting a financial payment transaction utilizing a point-of-sale system, in accordance with various embodiments. In this example, one or more hubs can be networked or otherwise connected to operate together in completing a financial or other transaction. For example, a first hub can include a network interface element or other networking component to communicate with a second hub and can establish 442 a network connection with the second hub, where the connection can be a wired or wireless connection. In this example, data or other transaction information received from at least one peripheral component connected to the second hub can be received 444 at the first hub and provided 446 to the computing device. The computing device can process the transaction information to perform 448 at least one operation based at least in part on the transaction information. For example, a bar code scanner connected to the second hub can scan a barcode. Information received from the bar code scanner can be communicated from the second hub to the first hub. The first hub can provide the information to the computing device and the computing device can process the information accordingly, such as by retrieving a price of a product associated with the barcode.

Figure 5:
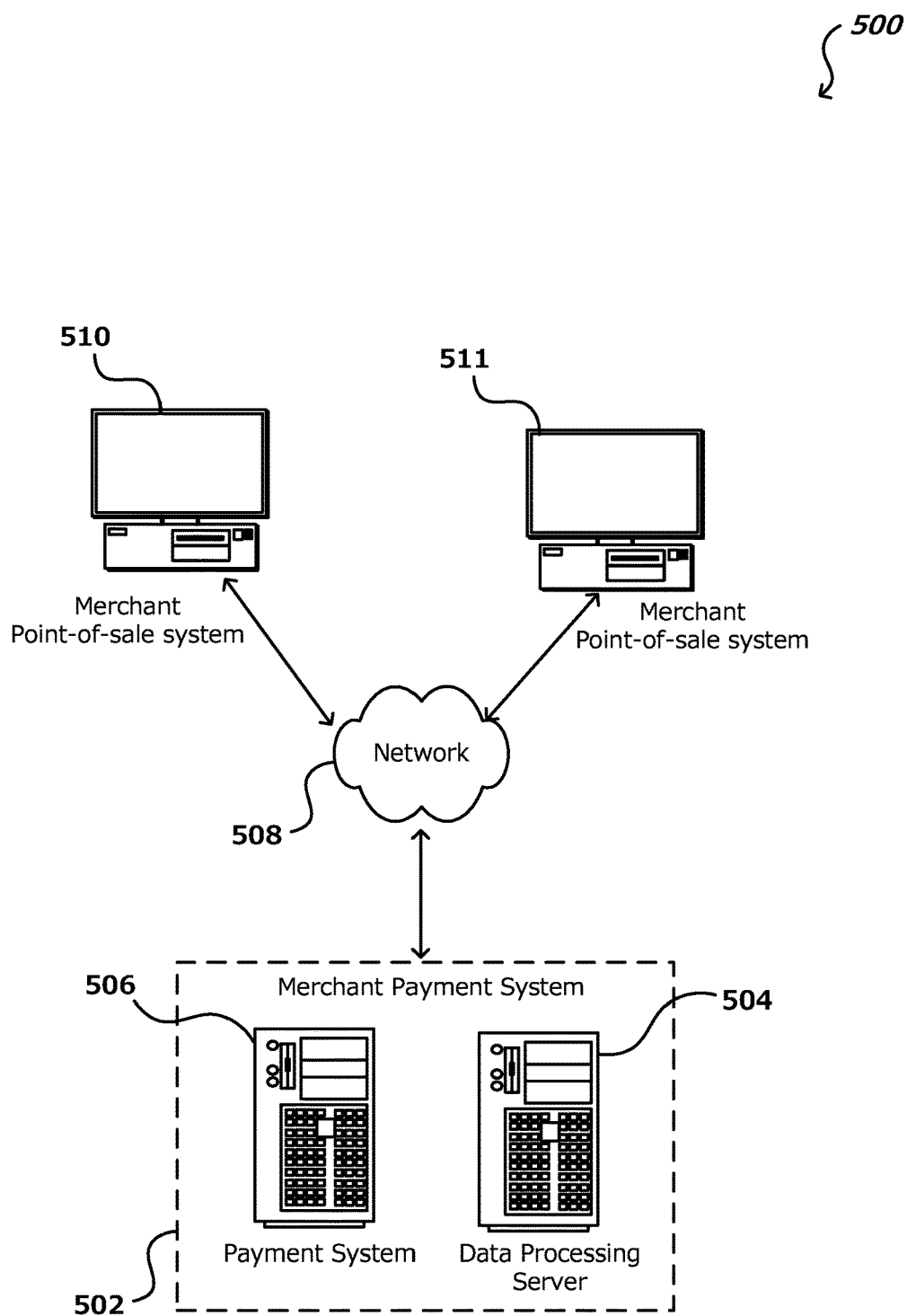
FIG. 5 illustrates an example environment for conducting a financial payment transaction in accordance with an alternate embodiment.

FIG. 5 illustrates an example environment for conducting a financial transaction at a point-of-sale system in accordance with various embodiments. In this example, the exemplary environment 500 includes a merchant payment system 502 for processing transactions between a customer and a merchant. The merchant payment system includes, for example, a data processing server 504 and a payment server 506. The data processing server can be implemented as computer programs on one or more computers in one or more locations, in which the systems, components, and techniques described below can be implemented. The operation of the payment server is described below in reference to FIG. 6. The example environment also includes computing devices, e.g., transaction registers or other point-of-sale systems, corresponding to the merchant 510 and 511.

As described, the point-of-sale systems 510 and 511 can include the hub (e.g., hub 204) and computing device, where the computing device can be coupled to or in communication with the merchant payment system through a data communication network 508, e.g., the Internet. These devices each generally include a memory, e.g., a random access memory (RAM), for storing instructions and data, and a processor for executing stored instructions. The devices and can each include one or more components, e.g., software or hardware, that are operable to send and receive requests, messages, or other types of information over the network. Some examples of computing devices include personal computers, cellular phones, handheld messaging devices, laptop computers, personal data assistants, tablet devices, and the like.

The network 508 can include any appropriate network, including an intranet, the Internet, a cellular network, a local area network, a wide area network, or any other such network, or combination thereof. Components used for such a system can depend at least in part upon the type of network, the environment selected, or both. Protocols and components for communicating over such a network are well known and will not be discussed herein in detail. The devices and the referral system can communicate over the network using wired or wireless connections, and combinations thereof.

Each of the computing devices is configured to send to the merchant payment system respective financial data that corresponds to a financial transaction that was processed by the computing device. The financial data can include, for example, data stored in a financial payment card, e.g., Track 1 data, receipt email addresses, and information describing a card-less payment account. Other examples of financial data that can be captured includes purchase data, e.g., an itemized listing of purchases, card mix data, geolocation data indicating a geographic location of a particular transaction, online/offline card data, data describing the merchant, e.g., merchant category codes (MCCs), and any type of data that is received upon a customer's authentication into a social network.

Figure 6:
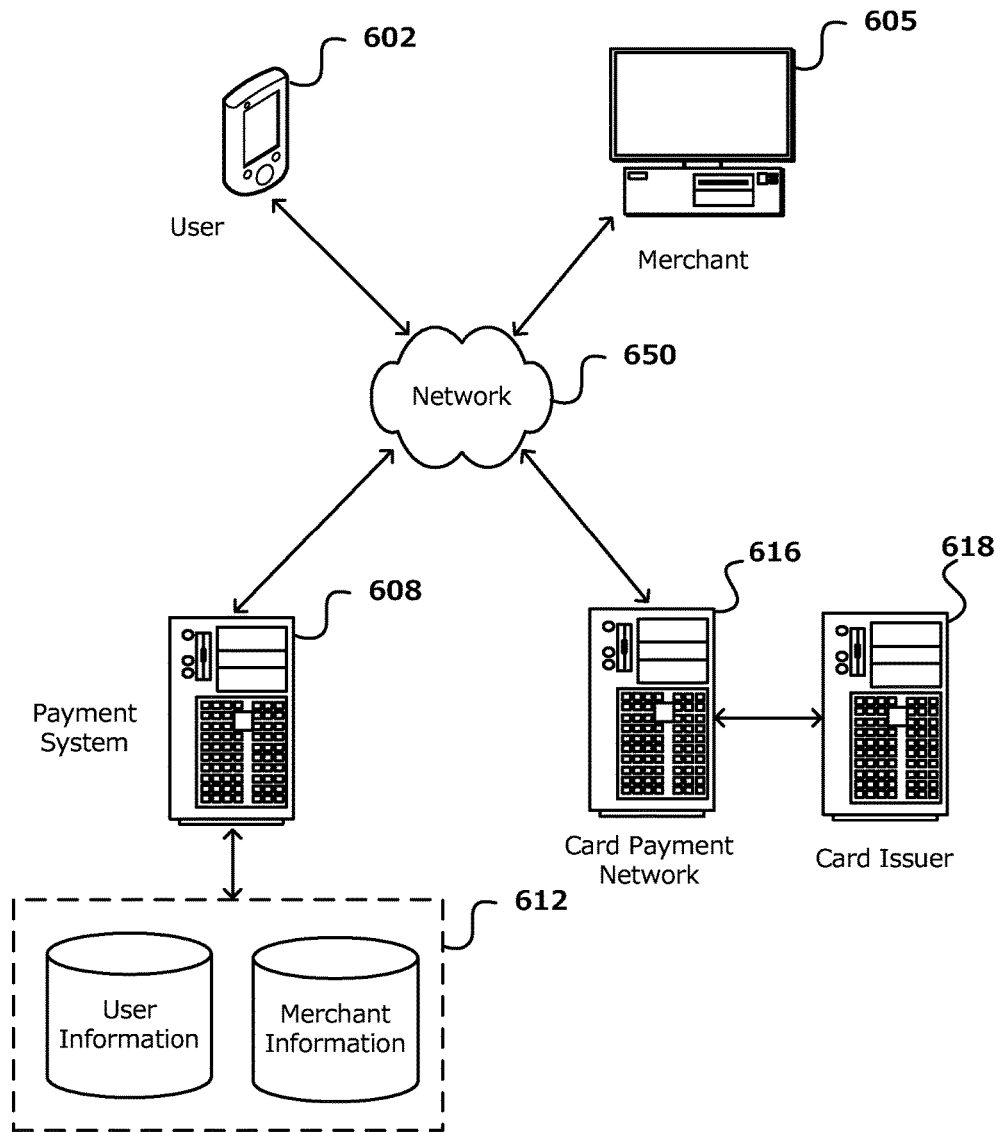
FIG. 6 illustrates an example environment for implementing a merchant payment system.

FIG. 6 illustrates an example of an environment 600 for implementing a payment service network. Although a mobile device environment is described for purposes of explanation, different environments may be used, e.g., a web-based environment, to implement various embodiments. The example environment includes a payment system 608, which can be implemented as computer programs on one or more computers in one or more locations, in which the systems, components, and techniques described below can be implemented. The example environment also includes a user device 602 and a merchant device 605.

The user device and the merchant device can each be a computer coupled to the payment system through a data communication network 650, e.g., the Internet. The user device and the merchant device each generally include a memory, e.g., a random access memory (RAM), for storing instructions and data, and a processor for executing stored instructions. The user device and the merchant device can each include one or more components, e.g., software or hardware, that are configured to respectively determine a geographic location of the user device or the merchant device, using, for example, various geolocation techniques, e.g., a global positioning system (GPS). Further, the user device and the merchant device can each be any appropriate device operable to send and receive requests, messages, or other types of information over the network. Some examples of user devices include personal computers, cellular phones, handheld messaging devices, laptop computers, personal data assistants, tablet devices, and the like.

The network can include any appropriate network, including an intranet, the Internet, a cellular network, a local area network, a wide area network, or any other such network, or combination thereof. Components used for such a system can depend at least in part upon the type of network, the environment selected, or both. Protocols and components for communicating over such a network are well known and will not be discussed herein in detail. The payment system, the merchant device, and the user device can communicate over the network using wired or wireless connections, and combinations thereof.

As used in this specification, a financial transaction is a transaction that is conducted between a customer and a merchant at a point-of-sale. When paying for a financial transaction, the customer can provide the merchant with cash, a check, or credit card for the amount that is due. The merchant can interact with a point-of-sale device, e.g., merchant device, to process the financial transaction. During financial transactions, the point-of-sale device can collect data describing the financial transaction, including, for example, the amount of payment received from customers.

In some implementations, the payment system is configured to accept card-less payment transactions from customers, e.g., the customer. As used in this specification, a card-less payment transaction is a transaction conducted between the customer and a merchant at the point-of-sale during which a financial account of the customer is charged without the customer having to physically present a financial payment card to the merchant at the point-of-sale. That is, the merchant need not receive any details about the financial account, e.g., the credit card issuer or credit card number, for the transaction to be processed.

Before conducting card-less payment transactions, the customer typically creates a user account with the payment system. The customer can create the user account, for example, by interacting with a user application that is configured to perform card-less payment transactions and that is running on the user device. When creating a user account with the payment system, the customer will provide information of the customer, data describing a financial account of the customer, e.g., credit card number, expiration date, and a billing address. This user information can be securely stored by the payment system, for example, in a user information database. To accept card-less payment transactions, the merchant typically creates a merchant account with the payment system by providing information describing the merchant including, for example, a merchant name, contact information, e.g., telephone numbers, the merchant's geographic location address, and one or more financial accounts to which funds collected from users will be deposited. This merchant information can be securely stored by the payment system, for example, in a merchant information database.

The payment system is configured to perform card-less payment transactions. The payment system can include one or more servers that are configured to securely perform electronic financial transactions, e.g., electronic payment transactions, between a customer and a merchant, for example, through data communicated between the user device and the merchant device. Generally, when a customer and a merchant enter into an electronic financial transaction, the transaction is processed by transferring funds from a financial account associated with the user account to a financial account associated with the merchant account.

The payment system is configured to send and receive data to and from the user device and the merchant device. For example, the payment system can be configured to send data describing merchants to the user device using, for example, the information stored in the merchant information database 612. For example, the payment system can communicate data describing merchants that are within a threshold geographic distance from a geographic location of the user device, as described in this specification. The data describing merchants can include, for example, a merchant name, geographic location, contact information, and an electronic catalogue, e.g., a menu, that describes items that are available for purchase from the merchant.

In some embodiments, the payment system is configured to determine whether a geographic location of the user device is within a threshold geographic distance from a geographic location of the merchant device. The payment system can determine a geographic location of the user device using, for example, geolocation data provided by the user device. Similarly, the payment system can determine a geographic location of the merchant device using, for example, geolocation data provided by the merchant device or using a geographic address, e.g., street address, provided by the merchant. Depending on the implementation, the threshold geographic distance can be specified by the payment system or by the merchant.

Determining whether the user device is within a threshold geographic distance of the merchant device can be accomplished in different ways including, for example, determining whether the user device is within a threshold geographic radius of the merchant device, determining whether the user device is within a particular geofence, or determining whether the user device can communicate with the merchant device using a specified wireless technology, e.g., Bluetooth or Bluetooth low energy (BLE). In some embodiments, the payment system restricts card-less payment transactions between the customer and the merchant to situations where the geographic location of the user device is within a threshold geographic distance from a geographic location of the merchant device.

The payment system can also be configured to communicate with a computer system 616 of a card payment network, e.g., Visa or MasterCard, over the network, or over a different network, for example, to conduct electronic financial transactions. The computer system of the card payment network can communicate with a computer system 616 of a card issuer, e.g., a bank. There may be computer systems of other entities, e.g., the card acquirer, between the payment system and the computer system of the card issuer.

The customer operating the user device that is within a threshold geographic distance of the merchant can interact with a user application running on the user device to conduct a card-less payment transaction with the merchant. While interacting with the user application, the customer can select the merchant, from a listing of merchants, with whom the customer wants to enter into a card-less payment transaction. The user can select the merchant, for example, by selecting a "check in" option associated with the merchant. The user device can communicate data to the payment system indicating that the customer has checked in with the merchant. In response, the payment system can communicate data to notify the merchant device that the user has checked in. A merchant application running on the merchant device can notify the merchant that the user has electronically checked in with the merchant through a display screen of the merchant device.

Once checked in, the customer can collect, or request, items that are available for purchase from the merchant. When the customer is ready to enter into the card-less payment transaction, the customer can, for example, approach a point-of-sale for the merchant and identify him or herself. For example, the customer can verbally notify the merchant that the customer wants to enter into a card-less payment transaction and can provide the merchant with the customer's name. The merchant can then interact with the merchant application to select the customer, from a listing of customers that have checked in with the merchant, to initiate a card-less payment transaction for the items being purchased by the customer. For example, the merchant can determine a total amount to bill the customer for the items being purchased. The customer can verbally approve the total amount to be billed and, in response, the merchant can submit a request for a card-less payment transaction for the total amount to the payment system. In response, the payment system can obtain, for example, from the user information database, data describing a financial account associated with a user account of the customer to which the total amount will be billed.

The payment system can then communicate with the computer system of a card payment network to complete an electronic financial transaction for the total amount to be billed to the customer's financial account. Once the electronic financial transaction is complete, the payment system can communicate data describing the card-less payment transaction to the user device, e.g., an electronic receipt, which can, for example, notify the customer of the total amount billed to the user for the card-less payment transaction with the particular merchant.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A point-of-sale system, comprising:
   a transaction medium reader coupled to a portable computing device host that is prohibited from acting as a host to multiple peripheral devices, the transaction medium reader configured to read transaction data from a transaction medium and to send the transaction data to the portable computing device host to facilitate a financial transaction between a customer and a merchant using a merchant application of the portable computing device host, wherein the merchant application of the portable computing device host is configured to communicate with a first electronic peripheral device via a hub during the financial transaction between the customer and the merchant; and
   the hub, wherein the hub includes:
      a first Universal Serial Bus (USB) connector, wherein the first USB connector is configured to provide power and data to the portable computing device host at least during a first time period in which the merchant is using the merchant application, wherein the first USB connector provides the data to the portable computing device host via a USB communication protocol, a second connector that is configured to receive power from a power source, the power used at the hub and provided via the first USB connector to the portable computing device host, a plurality of USB client peripheral ports, each USB client peripheral port coupled to one of a plurality of electronic peripheral devices that includes the first electronic peripheral device, a network interface that receives configuration information over a network from a remote server, a host processor that is electrically coupled to each of the plurality of USB client peripheral ports, wherein the host processor operates as a USB host to each of the plurality of electronic peripheral devices and interacts with each of the plurality of electronic peripheral devices independently from the portable computing device host, wherein the host processor also formats one or more communications according to an acceptable format to operate as a single USB client peripheral to the portable computing device host via the first USB connector and according to the USB communication protocol, wherein software run by the host processor is updated as a background process using the configuration information to enable support for at least one of the plurality of electronic peripheral devices, and an enclosure surrounding at least the hub.

2. The point-of-sale system of claim 1, further comprising:
a network transceiver configured to communicate with a second hub that is remote from the hub, wherein the hub is configured to operate the first electronic peripheral device during the financial transaction between the customer and the merchant and in response to communicating with the second hub.

3. The point-of-sale system of claim 1, wherein the software run by the host processor that is updated using the configuration information is a firmware.

4. The point-of-sale system of claim 1, wherein the first electronic peripheral device is one of a cash drawer, a receipt printer, or a bar code scanner.

5. The point-of-sale system of claim 1, further comprising a cradle to support the portable computing device host, wherein the hub is remote from the cradle.

6. The point-of-sale system of claim 1, wherein the transaction medium is a magnetic stripe of a transaction card.

7. The point-of-sale system of claim 1, wherein the transaction medium is a chip of a transaction card.

8. The point-of-sale system of claim 1, wherein the transaction medium is a wireless signal.

9. The point-of-sale system of claim 1, wherein at least the first electronic peripheral device of the plurality of electronic peripheral devices corresponds to an Application Programming Interface (API) through which the merchant application of the portable computing device host is configured to cause a function to occur at the first electronic peripheral device.

10. The point-of-sale system of claim 1, wherein the hub is configured to receive peripheral data from the first electronic peripheral device of the plurality of electronic peripheral devices via a first USB client peripheral port of the plurality of USB client peripheral ports, wherein the hub is configured to process the peripheral data into a peripheral signal, and wherein the hub is configured to transmit the peripheral signal to the portable computing device host.

11. The point-of-sale system of claim 1, wherein the hub includes:
a multiplexer configured to connect the hub to a plurality of portable computing devices including the portable computing device host, wherein the hub is configured to permit access to the first electronic peripheral device of the plurality of electronic peripheral devices to each of the plurality of portable computing devices.

12. The point-of-sale system of claim 1, wherein the host processor is associated with a unique identifier, and wherein the hub authorizes the portable computing device host to communicate with the host processor via the hub in response to the portable computing device host identifying the unique identifier.

13. A method for point-of-sale operations, the method comprising:
receiving power from a power source via a power source connector of a hub;
providing the power from the power source to a portable computing device host via a Universal Serial Bus (USB) device connector of the hub, wherein the portable computing device host includes a merchant application and is prohibited from acting as a host to multiple peripheral devices;
reading transaction data from a transaction medium via a transaction medium reader coupled to the portable computing device host;
sending the transaction data to the portable computing device host, the merchant application of the portable computing device host to facilitate a financial transaction between a customer and a merchant based on the transaction data;
receiving configuration information at a network interface of the hub over a network and from a remote server;
updating software stored at the hub as a background process using the configuration information to enable support for at least one of a plurality of electronic peripheral devices;
operating a microcontroller of the hub as a USB host to each of the plurality of electronic peripheral devices via a plurality of USB client peripheral ports of the hub and interacting with each of the plurality of electronic peripheral devices independently from the portable computing device host, wherein the plurality of USB client peripheral ports includes a first USB client peripheral port that is configured to couple to a first electronic peripheral device of the plurality of electronic peripheral devices; and
conveying a communication between the first electronic peripheral device and the portable computing device host via the hub during the financial transaction between the customer and the merchant, wherein the microcontroller of the hub formats one or more communications according to an acceptable format to operate as a single USB client peripheral to the portable computing device host while conveying the communication.

14. The method of claim 13, further comprising:
receiving secondary transaction data at the hub from a second hub remote to the hub; and
conveying a secondary communication between the first electronic peripheral device and the portable computing device host via the hub during the financial transaction between the customer and the merchant.

15. The method of claim 13, wherein the first electronic peripheral device is at least one of a cash drawer, a receipt printer, or a bar code scanner.

16. The method of claim 13, further comprising supporting the portable computing device host via a cradle, wherein the hub is remote from the cradle.

17. The method of claim 13, wherein the first electronic peripheral device corresponds to an Application Programming Interface (API) through which the merchant application of the portable computing device host is configured to cause a function to occur at the first electronic peripheral device in response to conveyance of the communication between the first electronic peripheral device and the portable computing device host.

18. The method of claim 13, further comprising:
   receiving peripheral data from the first electronic peripheral device via the first USB client peripheral port of the hub;
   processing the peripheral data into a peripheral signal; and
   transmitting the peripheral signal to the portable computing device host via the device connector.

19. The method of claim 13, wherein the hub includes a multiplexer configured to connect the hub to a plurality of portable computing devices including the portable computing device host, further comprising:
   permitting access to the first electronic peripheral device to each of the plurality of portable computing devices.

20. The method of claim 13, wherein the microcontroller of the hub is associated with a unique identifier, and wherein the hub authorizes the portable computing device host to communicate with the microcontroller via the hub in response to the portable computing device host identifying the unique identifier.

* * * * *